(12) United States Patent
Kodaka et al.

(10) Patent No.: US 8,971,337 B2
(45) Date of Patent: Mar. 3, 2015

(54) PACKET RELAY DEVICE

(75) Inventors: Hideo Kodaka, Ebina (JP); Kengo Miyajima, Ayase (JP)

(73) Assignee: Alaxala Networks Corporation, Kanagawa (JP)

( * ) Notice: Subject to any disclaimer, the term of this patent is extended or adjusted under 35 U.S.C. 154(b) by 385 days.

(21) Appl. No.: 13/004,908

(22) Filed: Jan. 12, 2011

(65) Prior Publication Data

US 2011/0211585 A1 Sep. 1, 2011

(30) Foreign Application Priority Data

Feb. 26, 2010 (JP) .................................. 2010-042131
Oct. 18, 2010 (JP) .................................. 2010-233598

(51) Int. Cl.
*H04L 12/28* (2006.01)
*H04L 12/701* (2013.01)
*H04L 12/709* (2013.01)

(52) U.S. Cl.
CPC .............. *H04L 45/00* (2013.01); *H04L 45/245* (2013.01); *Y02B 60/33* (2013.01)
USPC ............................ 370/401; 370/400; 370/463

(58) Field of Classification Search
None
See application file for complete search history.

(56) References Cited

U.S. PATENT DOCUMENTS

| | | | | |
|---|---|---|---|---|
| 6,687,758 B2 * | 2/2004 | Craft et al. ..................... | 709/250 |
| 7,173,934 B2 * | 2/2007 | Lapuh et al. ................... | 370/392 |
| 7,706,254 B2 * | 4/2010 | Moore et al. ................... | 370/219 |
| 7,724,653 B2 * | 5/2010 | Konuma et al. ............... | 370/220 |
| 7,729,361 B2 * | 6/2010 | Ma et al. ........................ | 370/400 |
| 7,738,507 B2 * | 6/2010 | Suzuki et al. .................. | 370/509 |
| 7,804,794 B2 * | 9/2010 | Shinohara et al. ............. | 370/311 |
| 7,835,291 B2 * | 11/2010 | Kotrla et al. ................... | 370/242 |
| 7,839,878 B2 * | 11/2010 | Hino et al. ..................... | 370/419 |
| 7,907,528 B2 * | 3/2011 | Liu et al. ........................ | 370/235 |
| 7,983,173 B2 * | 7/2011 | Finn .............................. | 370/242 |
| 8,098,572 B2 * | 1/2012 | Zhou et al. ..................... | 370/216 |
| 8,121,120 B2 * | 2/2012 | Kodaka et al. ................. | 370/389 |
| 8,144,576 B2 * | 3/2012 | Saltsidis et al. ............... | 370/228 |
| 8,199,672 B1 * | 6/2012 | Nachum et al. ................ | 370/254 |
| 8,295,290 B2 * | 10/2012 | Cardona et al. ................ | 370/400 |
| 8,437,262 B2 * | 5/2013 | Kotrla et al. ................... | 370/242 |
| 8,792,497 B2 * | 7/2014 | Rajagopalan et al. ......... | 370/395.3 |
| 8,817,817 B2 * | 8/2014 | Koenen et al. ................. | 370/468 |
| 2004/0085894 A1 * | 5/2004 | Wang et al. .................... | 370/216 |
| 2005/0265330 A1 * | 12/2005 | Suzuki et al. .................. | 370/389 |
| 2007/0189154 A1 * | 8/2007 | Hourtane et al. .............. | 370/218 |

(Continued)

FOREIGN PATENT DOCUMENTS

| | | |
|---|---|---|
| JP | 2007-228491 | 9/2007 |
| JP | 2008-098720 | 4/2008 |
| JP | 2008-244907 | 10/2008 |

OTHER PUBLICATIONS

AX6700S/AX6300S Software Manual Configuration Settings, ALAXALA Networks Corporation, Nov. 2006, pp. 181-182, vol. 1 Ver. 10.3 compatible.

*Primary Examiner* — Michael J Moore, Jr.
(74) *Attorney, Agent, or Firm* — Baker Botts L.L.P.

(57) ABSTRACT

A packet relay device determines a port to be placed on standby in a link aggregation, determines whether there is an active port among ports belonging to redundant network interfaces, and, if a network interface has no active port, places the network interface on standby. The packet relay device monitors whether a failure has occurred in an active network interface and, if a failure is detected, activates a standby network interface and places the failed network interface on standby.

20 Claims, 28 Drawing Sheets

(56) References Cited

U.S. PATENT DOCUMENTS

| | | |
|---|---|---|
| 2007/0201461 A1 | 8/2007 | Shinohara et al. |
| 2007/0237085 A1* | 10/2007 | Tirumalai et al. ............. 370/242 |
| 2008/0240133 A1 | 10/2008 | Tanaka |
| 2008/0304519 A1* | 12/2008 | Koenen et al. ................ 370/477 |
| 2009/0225752 A1* | 9/2009 | Mitsumori .................... 370/390 |
| 2010/0011230 A1* | 1/2010 | Mater .......................... 713/320 |
| 2010/0246409 A1* | 9/2010 | Kotrla et al. .................. 370/242 |
| 2011/0258346 A1* | 10/2011 | Said et al. ..................... 709/249 |

\* cited by examiner

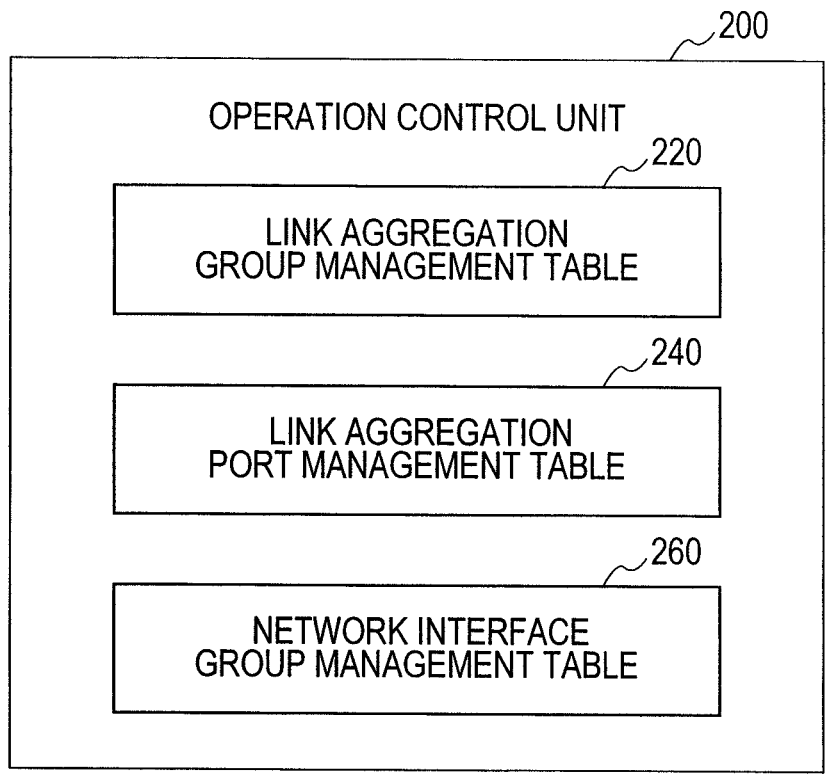

FIG. 4

| LA NUMBER | NIF NUMBER | PORT NUMBER | LA PRIORITY LEVEL | PORT STATE |
|---|---|---|---|---|
| 1 | 1 | 1 | 50 | ACT |
| 1 | 2 | 1 | 100 | SBY |
| 2 | 1 | 2 | 50 | ACT |
| 2 | 2 | 2 | 100 | SBY |
| ... | ... | ... | ... | ... |

FIG. 5

| NIF GROUP NUMBER | NIF NUMBER | PRESENCE OR ABSENCE OF LA ACT PORT | NIF STATE |
|---|---|---|---|
| 1 | 1 | PRESENCE | ACT |
| 1 | 2 | ABSENCE | SBY |
| 2 | 3 | PRESENCE | ACT |
| 2 | 4 | ABSENCE | SBY |
| ... | ... | ... | ... |

FIG. 10

| 280 LA NUMBER | 282 PORT COUNT | 284 LA TOTAL TRAFFIC VOLUME (Mbit/sec) | 286 LA THRESHOLD |
|---|---|---|---|
| 1 | 2 | 450 | 50% |
| 2 | 2 | 250 | 50% |
| ... | ... | ... | ... |

(columns labeled 280, 282, 284, 286, 288)

FIG. 11

| 300 LA NUMBER | 302 NIF NUMBER | 304 PORT NUMBER | 306 TRAFFIC VOLUME (Mbit/sec) | 308 PORT STATE |
|---|---|---|---|---|
| 1 | 1 | 1 | 250 | ACT |
| 1 | 2 | 1 | 200 | ACT |
| 2 | 1 | 2 | 150 | ACT |
| 2 | 2 | 2 | 100 | ACT |
| ... | ... | ... | ... | ... |

(columns labeled 300, 302, 304, 306, 308, 310)

FIG. 12

LA NUMBER = 1

| PORT COUNT | LA TOTAL TRAFFIC VOLUME UPPER LIMIT (Mbit/sec) |
|---|---|
| 2 | 1000 |
| 1 | 500 |

FIG. 13

| NIF GROUP NUMBER | NIF NUMBER | NIF PRIORITY LEVEL | PRESENCE OR ABSENCE OF ACT PORT | NIF STATE |
|---|---|---|---|---|
| 1 | 1 | 100 | PRESENCE | ACT |
| 1 | 2 | 300 | PRESENCE | ACT |
| 2 | 3 | 100 | PRESENCE | ACT |
| 2 | 4 | 300 | PRESENCE | ACT |
| ... | ... | ... | ... | ... |

| LA NUMBER | NIF NUMBER | PORT NUMBER | TRAFFIC VOLUME (Mbit/sec) | PORT STATE |
|---|---|---|---|---|
| 1 | 1 | 1 | 450 | ACT |
| 1 | 2 | 1 | 0 | SBY |
| 2 | 1 | 2 | 250 | ACT |
| 2 | 2 | 2 | 0 | SBY |
| ... | ... | ... | ... | ... |

| NIF GROUP NUMBER | NIF NUMBER | NIF PRIORITY LEVEL | PRESENCE OR ABSENCE OF ACT PORT | NIF STATE |
|---|---|---|---|---|
| 1 | 1 | 100 | PRESENCE | ACT |
| 1 | 2 | 300 | PRESENCE | SBY |
| 2 | 3 | 100 | PRESENCE | ACT |
| 2 | 4 | 300 | PRESENCE | SBY |
| ... | ... | ... | ... | ... |

FIG. 21

| LA NUMBER | NIF NUMBER | PORT NUMBER | PORT STATE | CHECK STATUS |
|---|---|---|---|---|
| 1 | 1 | 1 | FAILURE | CHECKED |
| 1 | 2 | 1 | ACT | CHECKED |
| 2 | 1 | 2 | SBY | CHECKED |
| 2 | 2 | 2 | ACT | UNCHECKED |
| ... | ... | ... | ... | ... |

FIG. 22

| NIF GROUP NUMBER | NIF NUMBER | NIF PRIORITY LEVEL | PRESENCE OR ABSENCE OF UNSTABLE PORT | NIF STATE |
|---|---|---|---|---|
| 1 | 1 | 100 | PRESENCE | SBY |
| 1 | 2 | 300 | ABSENCE | ACT |
| 2 | 3 | 100 | PRESENCE | SBY |
| 2 | 4 | 300 | ABSENCE | ACT |
| ... | ... | ... | ... | ... |

FIG. 23

NIF NUMBER =1, PORT NUMBER = 1

| CHECK ITEM | ACTUALLY MEASURED VALUE (dBm) | OCCURRENCE FREQUENCY | CHECK RESULT |
|---|---|---|---|
| RECEIVED OPTICAL POWER | −8.0 | 4 | ABNORMAL |
| TRANSMITTING OPTICAL POWER | −20.0 | 0 | NORMAL |
| ... | ... | ... | ... |

FIG. 24

| CHECK ITEM | NORMAL VALUE (dBm) | ALLOWABLE OCCURRENCE FREQUENCY |
|---|---|---|
| RECEIVED OPTICAL POWER | −5.0 TO +5.0 | 3 |
| TRANSMITTING OPTICAL POWER | −40.0 TO +8.2 | 0 |
| ... | ... | ... |

380

| NIF NUMBER (382) | PORT NUMBER (384) | LACP STATE (386) |
|---|---|---|
| 1 | 1 | ESTABLISHED |
| 1 | 2 | ESTABLISHED |
| ... | ... | ... |
| 2 | 1 | UNESTABLISHED |
| 2 | 2 | UNESTABLISHED |
| ... | ... | ... |

240A

| LA NUMBER (242A) | NIF NUMBER (244A) | PORT NUMBER (246A) | LA PRIORITY LEVEL (248A) | PORT STATE (250A) |
|---|---|---|---|---|
| 1 | 1 | 1 | 50 | ACT |
| 1 | 2 | 1 | 100 | ACT |
| 2 | 1 | 2 | 50 | ACT |
| 2 | 2 | 2 | 100 | ACT |
| ... | ... | ... | ... | ... |

| RETRY FREQUENCY 442 | NIF FAILURE ALLOWABLE OCCURRENCE FREQUENCY 444 |
|---|---|
| 3 | 1 |

| NIF GROUP NUMBER 462 | NIF NUMBER 464 | NIF PRIORITY LEVEL 466 | NIF STATE 468 | NIF FAILURE FREQUENCY 470 | NIF FAILURE 472 |
|---|---|---|---|---|---|
| 1 | 1 | 100 | ACT | 2 | 1 |
| 1 | 2 | 300 | ACT | 0 | 0 |
| 2 | 3 | 100 | ACT | 1 | 0 |
| 2 | 4 | 300 | ACT | 0 | 0 |
| ... | ... | ... | ... | ... | ... |

PACKET RELAY DEVICE

CLAIM OF PRIORITY

The present application claims priority from Japanese patent application serial no. 2010-042131, filed on Feb. 26, 2010, and Japanese patent application serial no. 2010-233598, filed on Oct. 18, 2010, the contents of which are hereby incorporated by reference into this application.

BACKGROUND OF THE INVENTION

The present invention relates to a packet relay device and, in particular, a high-reliability technology that is intended to enhance communication reliability using a redundant configuration and a packet relay device that reduces excess power.

The number of packet relay devices, which are routers or switches, has increased. High-volume information such as moving images has widely been used. As a result, intra-network traffic volumes have rapidly increased. Moreover, the power consumption of packet relay devices in Japan in 2025 is estimated to be 13 times more than that in 2006. Saving power in packet relay devices is an important challenge that helps prevent global warming.

To achieve the above, JP-A-2007-228491 discloses a technology that changes the clock frequency of a packet transfer unit which determines the transfer destination of received packets. "AX6700S/AX6300S Software Manual Configuration Settings, Vol. 1 Ver. 10.3 compatible, ALAXALA Networks Corporation, November 2006, pp. 181 to 182" describes a technology that restrains the power supply to ports connected to network lines as well as the power supply to packet transfer units.

On the other hand, simply saving power in a packet relay device sacrifices the continuity of communication. For this reason, power-saving technology is often used in combination with reliability technology that makes ports or packet transfer units redundant. Examples of technology that makes ports redundant include link aggregation, which is standardized as IEEE802.3ad. Link aggregation is a technology that, by handling multiple ports as a single line logically, expands the band as well as allows communication to continue even when a single line fails. To avoid communication interruption in link aggregation, JA-A-2008-098720 discloses a method of dynamically changing the number of ports included in link aggregation in accordance with the time zone or the traffic volume. JA-A-2008-244907 discloses a method of always synchronizing control information about link aggregation among multiple network interfaces.

Technologies that make packet transfer units redundant include a technology that uses all the redundant packet transfer units as active packet transfer units and a technology that places some of the redundant packet transfer units on standby as backups to be used when a failure occurs. Technologies that place some packet transfer units on standby include "hot standby," which keeps the standby packet transfer units in the same state as that of the active packet transfer units and can immediately replace a failed active packet transfer unit with a standby network interface, and "cold standby," which takes some time for such replacement. Generally, cold standby is more advantageous in terms of the amount of power reduction.

SUMMARY OF THE INVENTION

The present invention provides a technology that controls standby power consumed by standby network interfaces in a packet relay device including redundant multiple network interfaces forming multiple link aggregations.

The present invention also provides a technology that avoids communication interruption caused by repeated activation and deactivation of a standby network interface due to intermittent occurrence of a failure in a port of an active network interface in the packet relay device and the recovery of the port.

To solve at least one of the above-mentioned problems, there is provided a packet relay device that determines a port to be placed on standby in a link aggregation on the basis of information set on the device by a user, determines whether there is an active port among ports belonging to the redundant network interfaces, if a network interface has no active port, places the network interface itself on standby, monitors whether a failure has occurred in an active network interface, and, if a failure is detected, activates a standby network interface and places the failed network interface or a port thereof on standby.

There is also provided a packet relay device that calculates a traffic volume upper limit in accordance with the number of ports belonging to a link aggregation on the basis of threshold information specified by the user, compares the sum of traffic volumes of ports belonging to each link aggregation with the upper limit, the sum of traffic volumes being measured in a predetermined period, selects the optimum port count in accordance with the measured sum of traffic volumes, changes the current power supply to ports belonging to the link aggregations so that the number of active ports is equal to the optimum port count, and then determines whether there is an active port among ports belonging to the redundant network interfaces, and, if a network interface has no active port, places the network interface itself on standby.

There is also provided a packet relay device that holds a normal value range and an allowable occurrence frequency, the normal value range and the allowable occurrence frequency being criteria of check items, the check items being check items with which the quality of ports included in the link aggregations is checked, performs a check on the quality of the ports in a given period, if the check reveals that a port belonging to an active redundant network interface is abnormal, activates a standby network interface, and then places the active network interface itself on standby.

According to the present invention, it is possible to reduce standby power consumed by standby network interfaces, as well as to activate a standby network interface when a failure occurs in an active network interface, thereby continuing the communication.

BRIEF DESCRIPTION OF THE DRAWINGS

Preferred embodiments of the present invention will now be described in conjunction with the accompanying drawings, in which;

FIG. 2 is a diagram showing the structure of an operation control unit;

FIG. 3 is a diagram showing a link aggregation group management table;

FIG. 4 is a diagram showing a link aggregation port management table;

FIG. 5 is a diagram showing a network interface group management table;

FIG. 10 is a diagram showing a link aggregation total traffic volume management table;

FIG. 11 is a diagram showing a link aggregation port traffic volume management table;

FIG. 12 is a diagram showing a port count-specific traffic volume upper limit management table;

FIG. 13 is a diagram showing a network interface group management table;

FIG. 14 is a diagram showing a link aggregation port traffic volume management table;

FIG. 15 is a diagram showing a network interface group management table;

FIG. 21 is a diagram showing a link aggregation port check status management table;

FIG. 22 is a diagram showing a network interface group management table;

FIG. 23 is a diagram showing a port check result management table;

FIG. 24 is a diagram showing a check criteria table;

FIG. 36 is a diagram showing a network interface failure criteria table;

FIG. 37 is a diagram showing a network interface group management table;

DETAILED DESCRIPTION OF THE PREFERRED EMBODIMENTS

Figure 1:
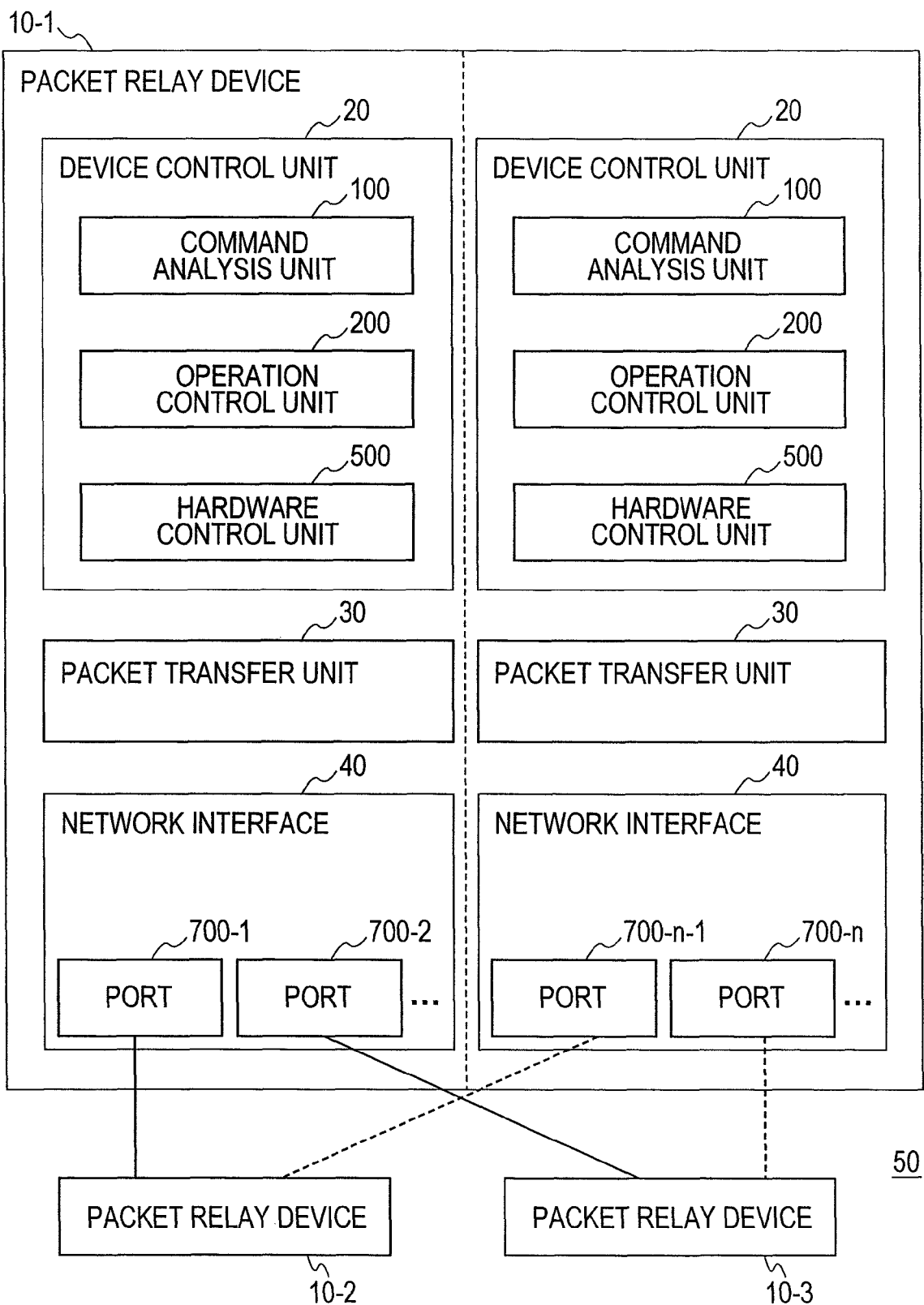
FIG. 1 is a block diagram showing the configurations of a packet relay device and a network.

Now, the embodiments of the present invention will be described in detail with reference to the accompanying drawings. Substantially the same components are assigned the same reference numerals and will not be described again.

Referring to FIG. 1, the internal structure of packet relay devices forming a network will be described. In FIG. 1, a network 50 includes three packet relay devices 10. To enhance communication reliability among the packet relay devices 10, link aggregation is used to make the lines redundant.

A single packet relay device 10 includes two device control units 20, two packet transfer unit 30, and two network interfaces 40. A single device control unit 20 includes a command analysis unit 100, an operation control unit 200, and a hardware control unit 500. A single network interface 40 includes multiple ports 700. A port 700-1 of a packet relay device 10-1 is connected to a packet relay device 10-2. A port 700-2 thereof is connected to a packet relay device 10-3. A port 700-(n-1) thereof is connected to the packet relay device 10-2. A port 700-n thereof is connected to the packet relay device 10-3.

The network interface 40 controls transmission and reception of packets to and from the network 50. A single packet transfer unit 30 is connected to the network interface 40 and determines the transfer destination of a received packet on the basis of the header information of the packet. The device control unit 20 stores a software program for controlling the packet relay device 10 itself. The device control unit 20, the packet transfer unit 30, and the network interface 40 are connected to one another via a bus.

Each port 700 terminates a physical line. The physical lines among the packet relay devices 10 form link aggregations connected to the ports 700 of the different network interfaces 40.

The software stored in the device control unit 20 performs the following operation. The command analysis unit 100 analyzes configuration information set by the user. The operation control unit 200 incorporates the configuration information from the command analysis unit 100, as well as, on the basis of the state of the hardware, determines the state of power supply to the device and issues a command. The hardware control unit 500 records set values in the hardware, controls power supply, collects statistic information, and detects a failure.

Referring to FIG. 2, the operation control unit 200 will be described in detail. In FIG. 2, the operation control unit 200 holds a link aggregation group management table 220, a link aggregation port management table 240, and a network interface group management table 260. The operation control unit 200 refers to these tables to determine the states of ports belonging to each link aggregation. On the basis of the states of the ports, the operation control unit 200 performs control so that unnecessary power supply to the ports 700 and the network interfaces 40 is reduced.

Referring to FIGS. 3 and 5, the tables held by the operation control unit 200 will be described in detail. In FIG. 3, the link aggregation group management table 220 includes an LA (link aggregation) number 222, a port count 224, and a maximum active port count 226. The maximum active port count 226 represents the maximum number of ports that are activated among multiple ports belonging to each of the link aggregations set in the configuration by the user. An LA number is a number for identifying a link aggregation. A port count represents the number of ports belonging to a link aggregation.

Referring to FIG. 4, the link aggregation port management table 240 will be described. In FIG. 4, the link aggregation port management table 240 includes an LA number 242, a network interface (NIF) number 244, a port number 246, an LA priority level 248, and a port state 250.

An LA number 242 is a number for identifying a link aggregation. An NIF number 244 is a number representing the position of a network interface designated as a port of a link aggregation. A port number 246 is a number representing the position of a port. LA priority levels 248 are information indicating priority levels on the basis of which the ports of each of the multiple link aggregations set by the user will be activated and are managed on a port-by-port basis. In each link aggregation, an LA priority level 248 having a smaller value represents a higher priority level. A port state 250 is a value representing the state of a port. Specifically, a port state 250 is one of "active (ACT)," "standby (SBY)," and "FAILURE." "ACT" indicates that the port 700 is active. "SBY" indicates that the port 700 is not active. "FAILURE" indicates that a failure has occurred in the port 700.

In FIG. 4, it is understood that, in both a link aggregation having an LA number of "1" and a link aggregation having an LA number of "2", a higher priority level is given to a port belonging to an NIF number of "1". Accordingly, the port state of a port number belonging to an NIF number of "2" in both link aggregations is SBY, allowing a reduction in the power supply to network interface unit 40 having the NIF number.

Referring to FIG. 5, the network interface group management table 260 will be described. In FIG. 5, the network interface group management table 260 includes an NIF group number 262, an NIF number 264, presence or absence of LA ACT port 266, and an NIF state 268.

In the network interface group management table 260, information about the redundancy of the network interfaces and the states of the network interfaces are managed. An NIF group number 262 is a number for identifying a group of redundant network interfaces 40. An NIF number 264 is a number representing the position of a network interface designated as a link aggregation port. The presence or absence of LA ACT port 266 indicates whether there is any linkup port (ACT port) among the link aggregation ports of an NIF. The presence or absence of LA ACT port 266 has a value "presence" or a value "absence." An NIF state 268 indicates the state of a network interface. An NIF state 268 is "ACT" or "SBY." "ACT" indicates that the network interface 40 is active. "SBY" indicates that the network interface 40 is not active.

[First Embodiment]

Figure 6:
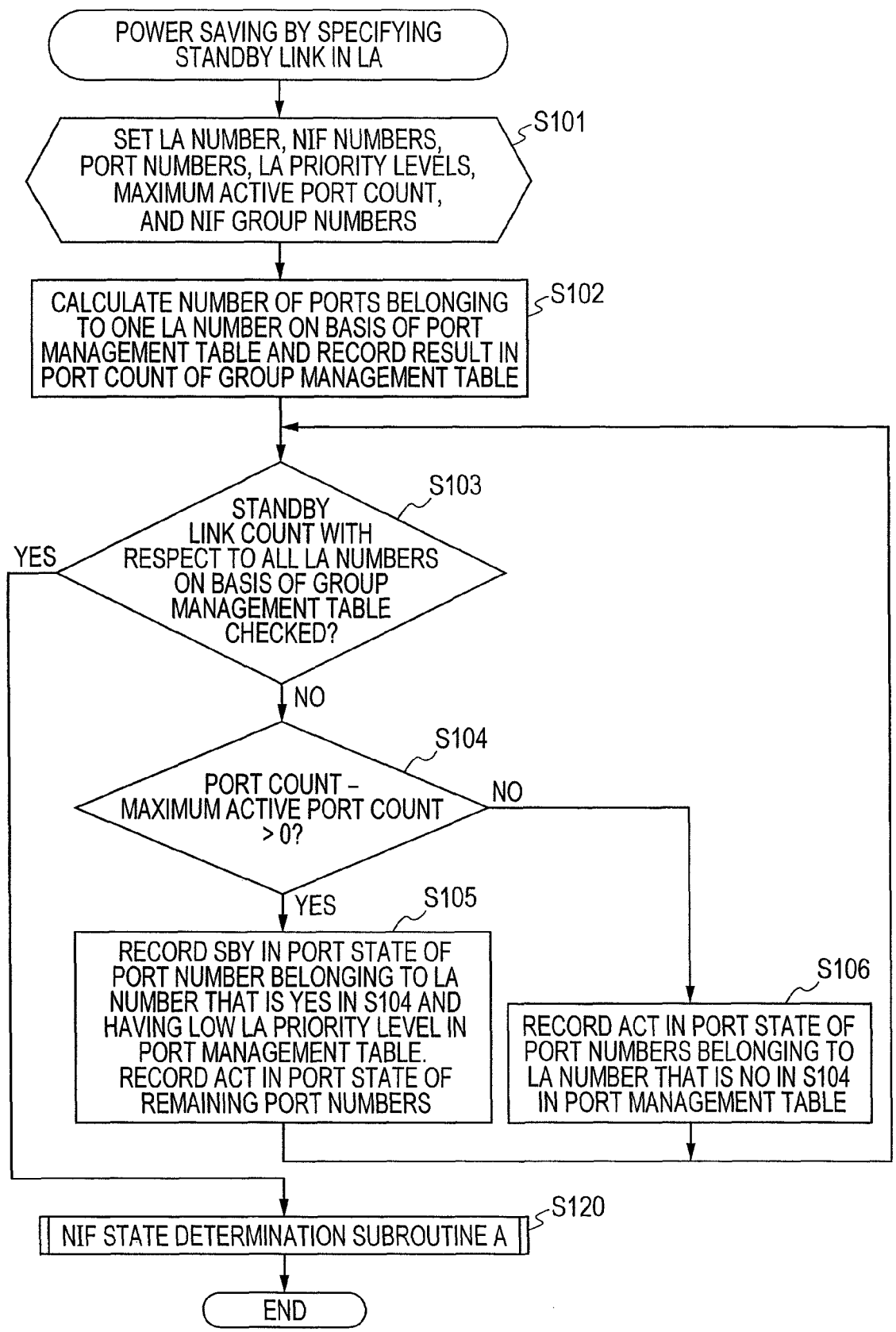
FIG. 6 is a flowchart of power saving by specifying a port in a link aggregation.
Figure 8:
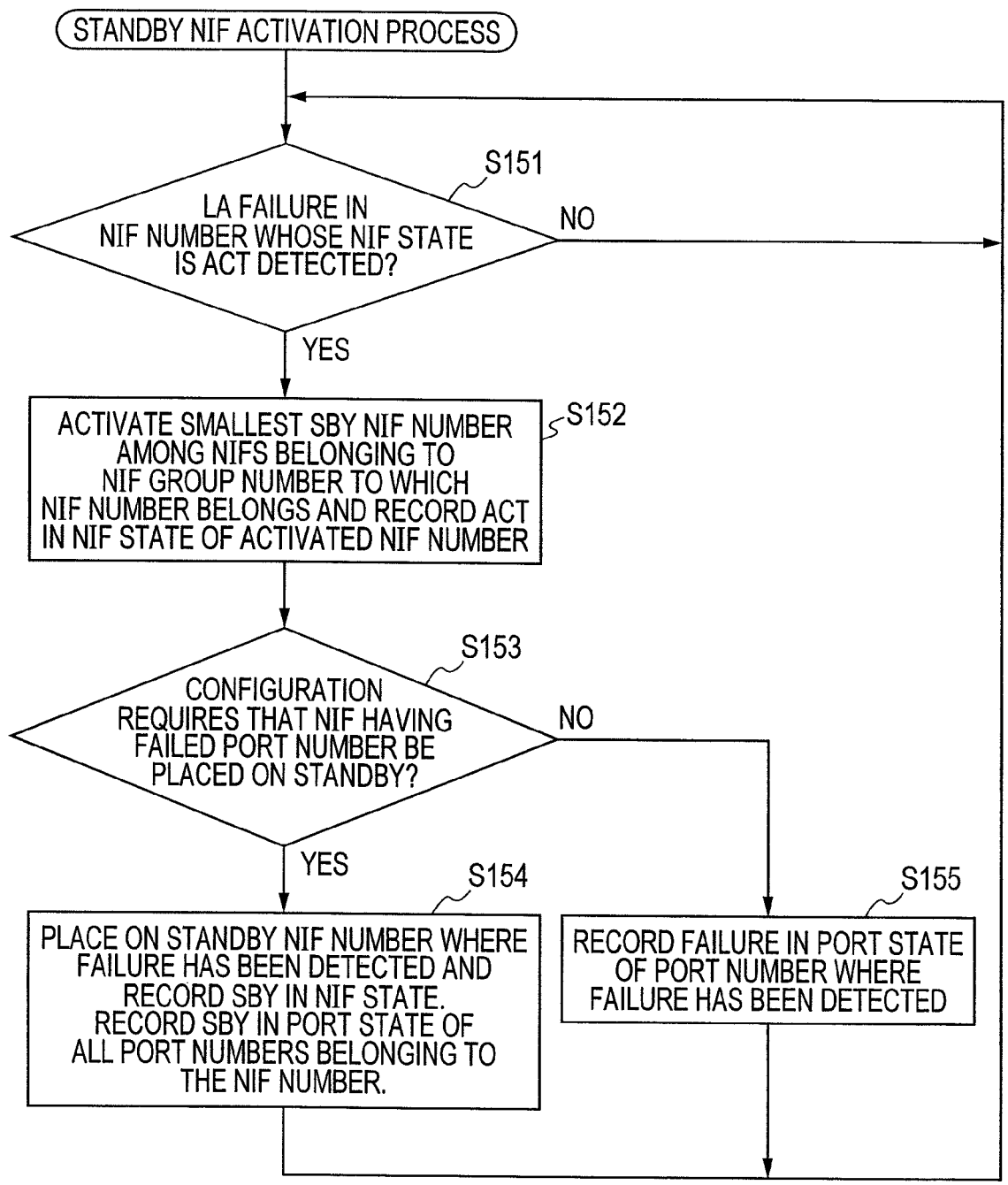
FIG. 8 is a flowchart of a standby network interface activation process.

Referring to FIGS. 6 and 8, the process flow according to the first embodiment will be described. In the first embodiment, each packet relay device 10 controls the power supply to the network interfaces 40 in accordance with the port state of the link aggregation using the group management table 220, the port management table 240, and the group management table 260.

To make the ports and the network interfaces redundant, the user previously sets up the configuration of each packet relay device 10. Specifically, to set up a link aggregation for making the ports redundant requires setting of an LA number for identifying a link aggregation, NIF numbers and port numbers belonging to the LA number, a maximum active port count representing the maximum number of ports that are activated among ports belonging to the LA number, and LA priority levels that represent priority levels on the basis of which ports will be placed on standby. If there are multiple link aggregations, it is more advantageous that specific network interfaces included in the link aggregations have the same LA priority level.

On the other hand, to make network interfaces redundant requires setting of an NIF group number, by which the network interfaces are grouped and identified, and NIF numbers, which are the numbers of the network interfaces belonging to the NIF group number.

The command analysis unit 100 analyzes these pieces of configuration information. The command analysis unit 100 notifies the operation control unit 200 of the analysis result. The operation control unit 200 then starts the process sequence.

In FIG. 6, the operation control unit 200 incorporates the information into the group management table 220, the port management table 240, and the group management table 260 (S101). The operation control unit 200 calculates the number of ports belonging to one LA number on the basis of the port management table 240 and records the calculated port count in the port count 224 of the group management table 220. The operation control unit 200 performs the above-mentioned process with respect to all the LA numbers (S102).

On the basis of the group management table 220, the operation control unit 200 calculates the number of ports to be placed on standby (hereafter referred to as "standby links") among ports belonging to each link aggregation. The operation control unit 200 then determines whether the standby link count has been calculated with respect to all the LA numbers (S103). If the determination in step 103 is YES, the operation control unit 200 jumps to an NIF state determination subroutine A and then returns to the process sequence and completes it.

If the determination in step 103 is NO, the operation control unit 200 determines whether "port count−maximum active port count >0" for each LA number, on the basis of the group management table 220 (S104). If the determination in step 104 is YES with respect to one LA number, the operation control unit 200 regards, as low-priority port numbers, port numbers having an LA priority level of a large value among port numbers belonging to the LA number in the port management table 240. The operation control unit 200 then records SBY (power-off of the ports) in the port state 250 of the port numbers. The operation control unit 200 instructs the hardware control unit 500 to place ports having the port numbers on standby. Accordingly, the hardware control unit 500 restrains the power supply to ports having the port numbers. In contrast, if the determination in step 104 is NO with respect to one LA number, the operation control unit 200 records ACT (link-up) in the port state 250 of port numbers belonging to the LA number in the port management table 240 (S106) and moves back to step 103.

After updating the port states on the basis of the configuration of the link aggregations, the operation control unit 200 updates the states of the redundant network interfaces. This process will be described with reference to FIG. 7.

Figure 7:
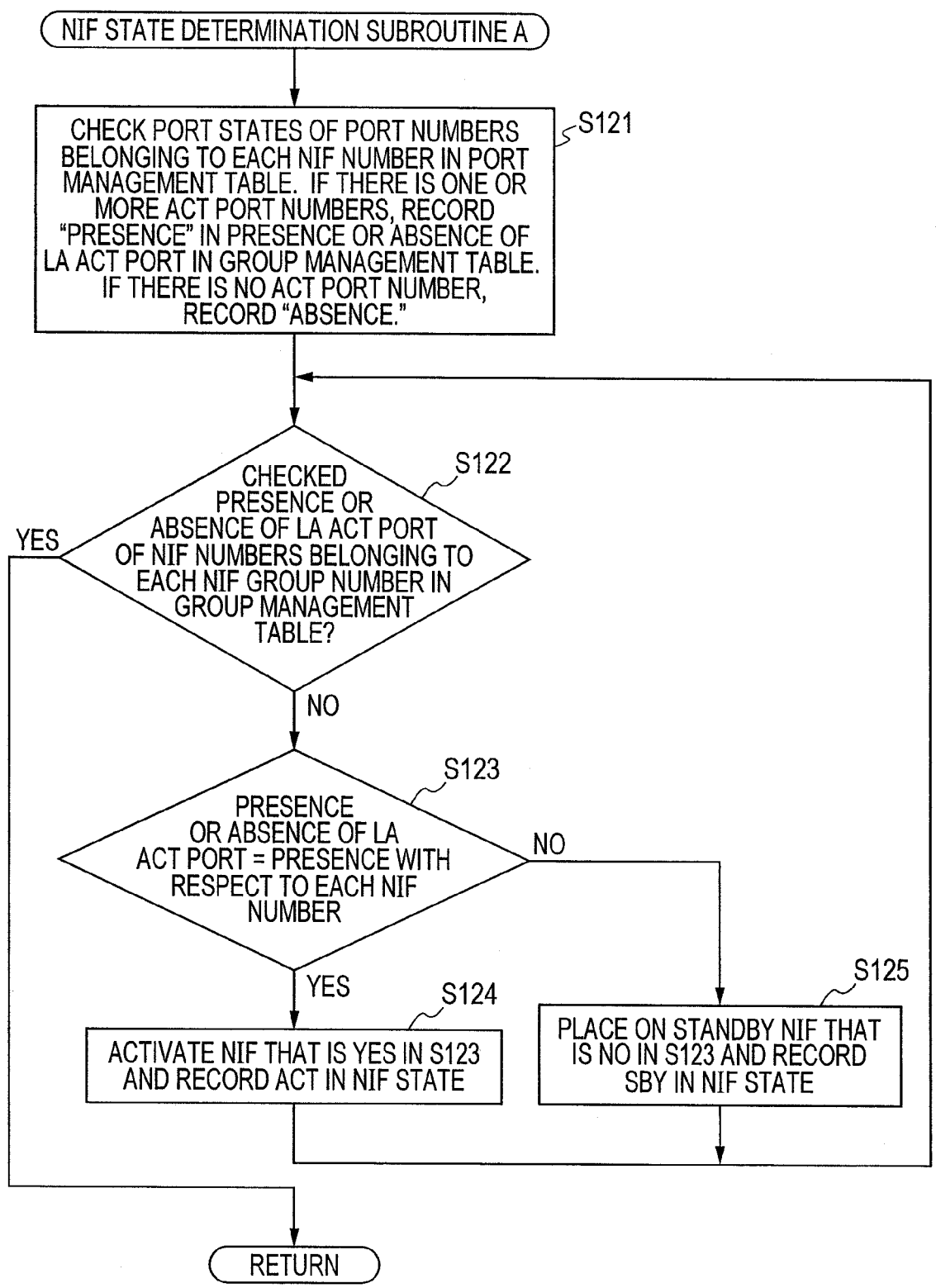
FIG. 7 is a flowchart of a network interface state determination subroutine A.

In FIG. 7, the operation control unit 200 refers to the port management table 240 to check the port states of port numbers belonging to each NIF number. If there is one or more ACT port numbers among port numbers belonging to one NIF number, the operation control unit 200 records "PRESENCE" in the presence or absence of LA ACT port 266 of the NIF number in the group management table 260. If there is no ACT port number, the operation control unit 200 records "ABSENCE" (S121).

The operation control unit 200 determines whether the presence or absence of an LA ACT port has been checked with respect to each of the NIF numbers belonging to each NIF group number in the group management table 260 (S122). If the determination in step 122 is YES, the operation control unit 200 returns to the process sequence.

If the determination in step 122 is NO, the operation control unit 200 determines whether "PRESENCE" is recorded in the presence or absence of LA ACT port 266 of each NIF number (S123). If the determination in step 123 is YES with respect to one NIF number, the operation control unit 200 activates the NIF number and records ACT in the NIF state 268 (S124), and moves back to step 122. Specifically, the operation control unit 200 instructs the hardware control unit 500 to activate an NIF having the NIF number and then records ACT in the NIF state 268 in the group management table 260. If the NIF state is already ACT, the operation control unit 200 does nothing.

In contrast, if "ABSENCE" is recorded in the presence or absence of LA ACT port 266 of one NIF number in step 123 (S123: NO), the operation control unit 200 places the NIF number on standby (power-off of the NIF) and records SBY in the NIF state 268 (S125), and moves back to step 122. Specifically, the operation control unit 200 instructs the hardware control unit 500 to stop the power supply to an NIF having the NIF number and then records SBY in the NIF state 268 in the group management table 260. If the NIF state is already SBY, the operation control unit 200 does nothing.

Referring to FIG. 8, the process to be performed when a failure occurs in a link aggregation port of an active network interface 40 will be described. In FIG. 8, the hardware control unit 500 determines whether a failure has been detected in a link aggregation port of an NIF number whose NIF state is ACT (S151). If the determination in step 151 is NO, the hardware control unit 500 moves back to step 151. If the determination in step 151 is YES, the hardware control unit 500 transmits failure information to the operation control unit 200. The operation control unit 200 selects, in the group management table 260, an NIF number whose NIF state is SBY from among NIF numbers belonging to an NIF group to which the NIF number having the failed port belongs. The operation control unit 200 then instructs the hardware control unit 500 to activate an NIF having the selected NIF number. If there are multiple NIF numbers whose NIF state is SBY, the operation control unit 200 preferentially selects the smallest NIF number (S152). The operation control unit 200 then records ACT in the NIF state 268 of the NIF number.

A failure in a link aggregation port refers to a hardware failure in a port of the device itself or a port of the opposite device designated as the link aggregation, a failure where a link aggregation control protocol data unit (LACPDU) defined by IEEE802.3ad cannot be received within a specified time, a unidirectional link failure detected by uni-directional link detection (UDLD), or the like.

The operation control unit 200 then determines whether the configuration requires that an NIF having a failed port number be placed on standby (S153). If the determination in step 153 is YES, the operation control unit 200 instructs the hardware control unit 500 to place a network interface having the NIF number on standby and records SBY in the NIF state 268. The operation control unit 200 also records SBY in the port state 250 of all port numbers belonging to the NIF number (S154) and moves back to step 151. If the determination in step 153 is NO, the operation control unit 200 records FAILURE in the port state 250 of the port number where a failure has been detected (S155) and moves back to step 151.

According to the first embodiment, the states of the redundant network interfaces are controlled in accordance with the state of the link aggregation port. This reduces standby power consumed by the standby network interfaces, as well as activates a standby network interface when a failure occurs in an active network interface, allowing communication to continue.

According to the first embodiment, there can be provided a packet relay device that includes redundant multiple network interfaces forming multiple link aggregations and that controls standby power consumed by standby network interfaces.

[Second Embodiment]

A second embodiment of the present invention will be described with reference to FIGS. 9 to 18. In the second embodiment, the packet relay device 10 performs control so that the ports 700 and the network interfaces 40 are placed in the optimum state, by using a total traffic volume management table 280, a port traffic volume management table 300, a traffic volume upper limit management table 320, and a group management table 340 to be described later and in accordance with a change in traffic volume of each link aggregation.

Figure 9:
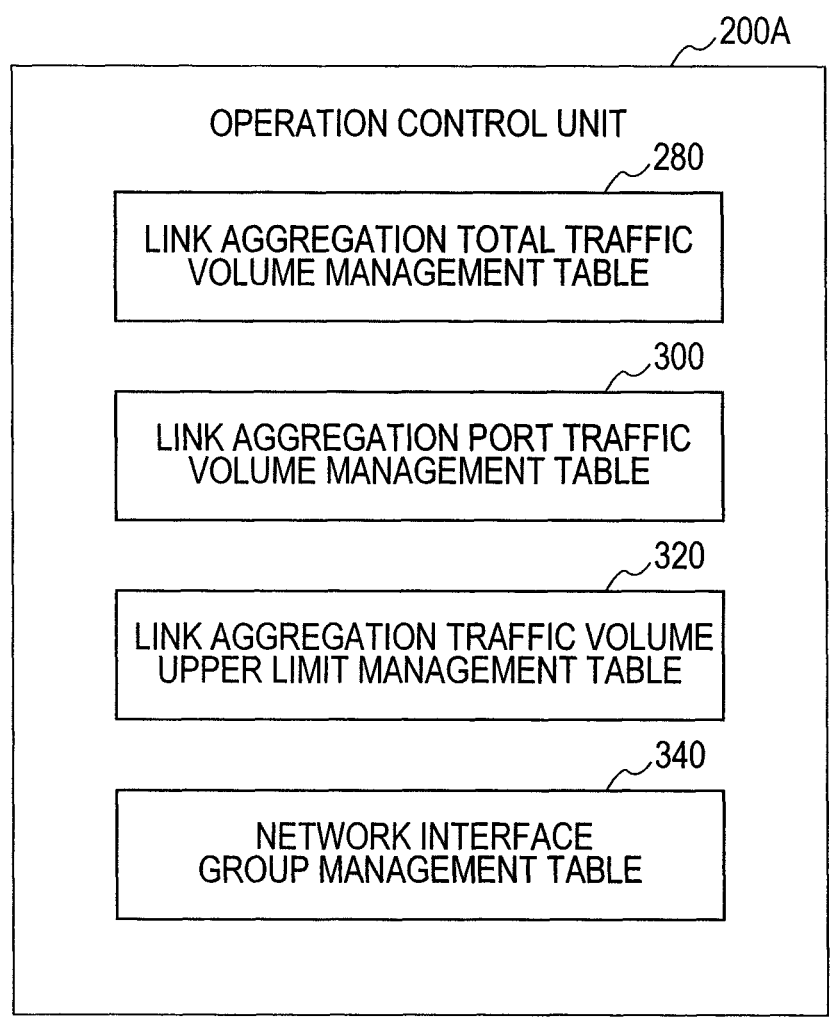
FIG. 9 is a diagram showing the structure of an operation control unit.

First, referring to FIG. 9, an operation control unit 200A according to the second embodiment will be described. In FIG. 9, the operation control unit 200A holds the link aggregation total traffic volume management table 280, the link aggregation port traffic volume management table 300, the link aggregation traffic volume upper limit management table 320, and the network interface group management table 340. The operation control unit 200A refers to these tables to switch the states of the ports 700 and the network interfaces 40 between ACT and SBY in accordance with a change in traffic volume.

Referring to FIG. 10, the link aggregation total traffic volume management table 280 will be described. In FIG. 10, the link aggregation total traffic volume management table 280 includes an LA number 282, a port count 284, an LA total traffic volume 286, and an LA threshold 288.

An LA number 282 is a number by which a link aggregation is identified. A port count 284 represents the number of ports belonging to a link aggregation. An LA total traffic volume 286 represents the sum of the traffic volumes of ports belonging to an LA number. An LA threshold 288 is a threshold set at an LA number.

When the traffic volume of a link aggregation is increased, standby ports must be linked up to increase the port count. At that time, the line band reaches the upper limit. Thus, there is a high possibility that packets will be discarded. For this reason, an LA threshold 288 is used as means for reducing the discarding of packets due to a change in the number of ports belonging to a link aggregation. An LA total traffic volume 286 is denoted in Mbit/sec. An LA threshold 288 is denoted in %.

Referring now to FIG. 11, the link aggregation port traffic volume management table 300 will be described. The link aggregation port traffic volume management table 300 shown in FIG. 11 is used to manage traffic volume by port. The link aggregation port traffic volume management table 300 includes an LA number 302, an NIF number 304, a port number 306, a traffic volume 308, and a port state 310.

Referring to FIG. 12, the port count-specific traffic volume upper limit management table 320 will be described. In the traffic volume upper limit management table 320 shown in FIG. 12, port counts 322 and LA total traffic volume upper limits 324 are managed by LA number. A port count 322 represents the number of active ports belonging to an LA. An LA total traffic volume upper limit 324 is calculated from a port count, the line band of a port, and the corresponding LA threshold. The traffic volume upper limit management table 320 is used in order to determine the optimum port count on the basis of traffic volume.

Note that FIG. 12 shows only description about the LA number 1.

Referring to FIG. 13, the network interface group management table 340 will be described. In the network interface group management table 340, pieces of information about the redundant network interfaces are managed. In FIG. 13, the network interface group management table 340 includes an NIF group number 342, an NIF number 344, an NIF priority level 346, presence or absence of LA ACT port 348, and an NIF state 350. NIF priority levels 346 are the priority levels of the redundant multiple network interfaces. An NIF priority level of a smaller value represents higher priority.

The link aggregation port traffic volume management table 300A shown in FIG. 14 and the network interface group management table 340A shown in FIG. 15 are different forms of the port traffic management table 300 and the group management table 340, respectively.

Figure 16:
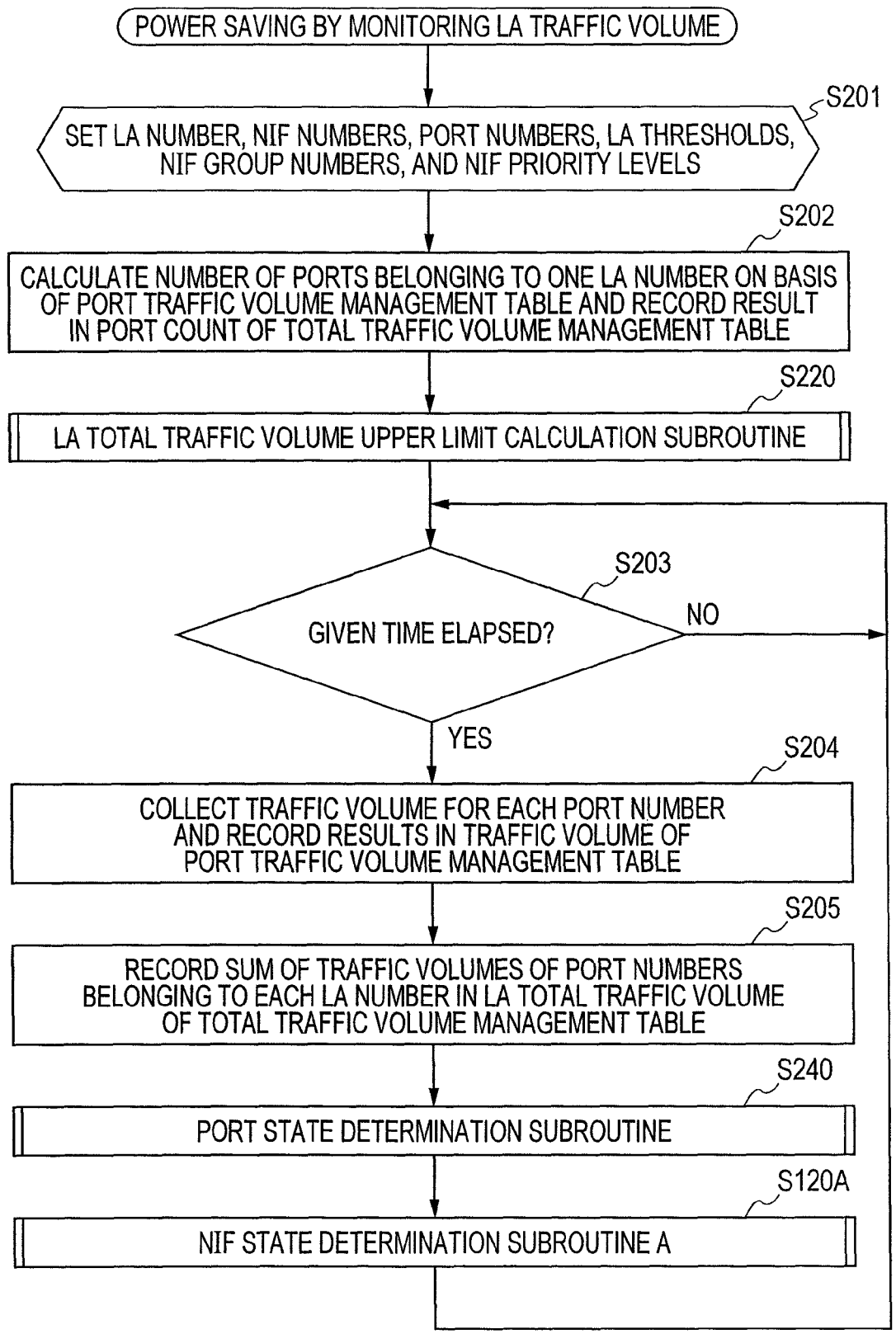
FIG. 16 is a flowchart of power saving based on link aggregation traffic volume.

Referring to FIG. 16, the flow of the port state and NIF state determination process that the operation control unit 200A performs will be described. The user previously sets up the configuration of the device so that the ports and the network interfaces are made redundant. To set up a link aggregation for making ports redundant requires setting of an LA number by which the link aggregation is identified, NIF numbers and port numbers belonging to the LA number, and the threshold of the total traffic volume of the LA. The LA total traffic volume threshold is intended to reduce packet loss due to a change in the number of ports belonging to the link aggregation. In the case where the line band is set as the upper limit of the total traffic volume and where the traffic volume tends to increase, packets may be discarded before standby ports are activated. To avoid this situation, a band smaller than the line band is set as a threshold. Thus, the ports or interfaces can be activated in a state where there is an allowance in the band line.

To make network interfaces redundant requires setting of an NIF group number by which the network interfaces are grouped and identified, NIF numbers which are the numbers of the network interfaces belonging to the NIF group number, and NIF priority levels on the basis of which the network interfaces will be placed on standby.

The command analysis unit 100 analyzes these pieces of configuration information. The command analysis unit 100 notifies the operation control unit 200A of the analysis result. The operation control unit 200A then starts the flow. The operation control unit 200A incorporates the configuration information into the total traffic volume management table 280, the port traffic volume management table 300, and the group management table 340 (S201).

The operation control unit 200A calculates the number of ports belonging to one LA number on the basis of the port traffic management table 300 and records the calculated port count in the port count 284 of the total traffic volume management table 280. The operation control unit 200A performs the above-mentioned process with respect to each LA number (S202). The operation control unit 200A then performs an LA total traffic volume upper limit calculation subroutine (S220). The operation control unit 200A then returns to the process flow and determines whether a given time has elapsed (S203). If the determination in step 203 is YES, the operation control unit 200A records traffic volumes collected for each port number in the port traffic volume management table 300 (S204). The operation control unit 200A records the sum of the traffic volumes of ports belonging to each link aggregation number in the LA total traffic volume 286 of the total traffic volume management table 280 (S205). The operation control unit 200A then performs a port state determination subroutine (S240). The operation control unit 200A then returns from the port state determination subroutine and performs an NIF state determination subroutine A (S120A). The operation control unit 200A then returns from the NIF state determination subroutine A and moves back to step 203.

Figure 17:
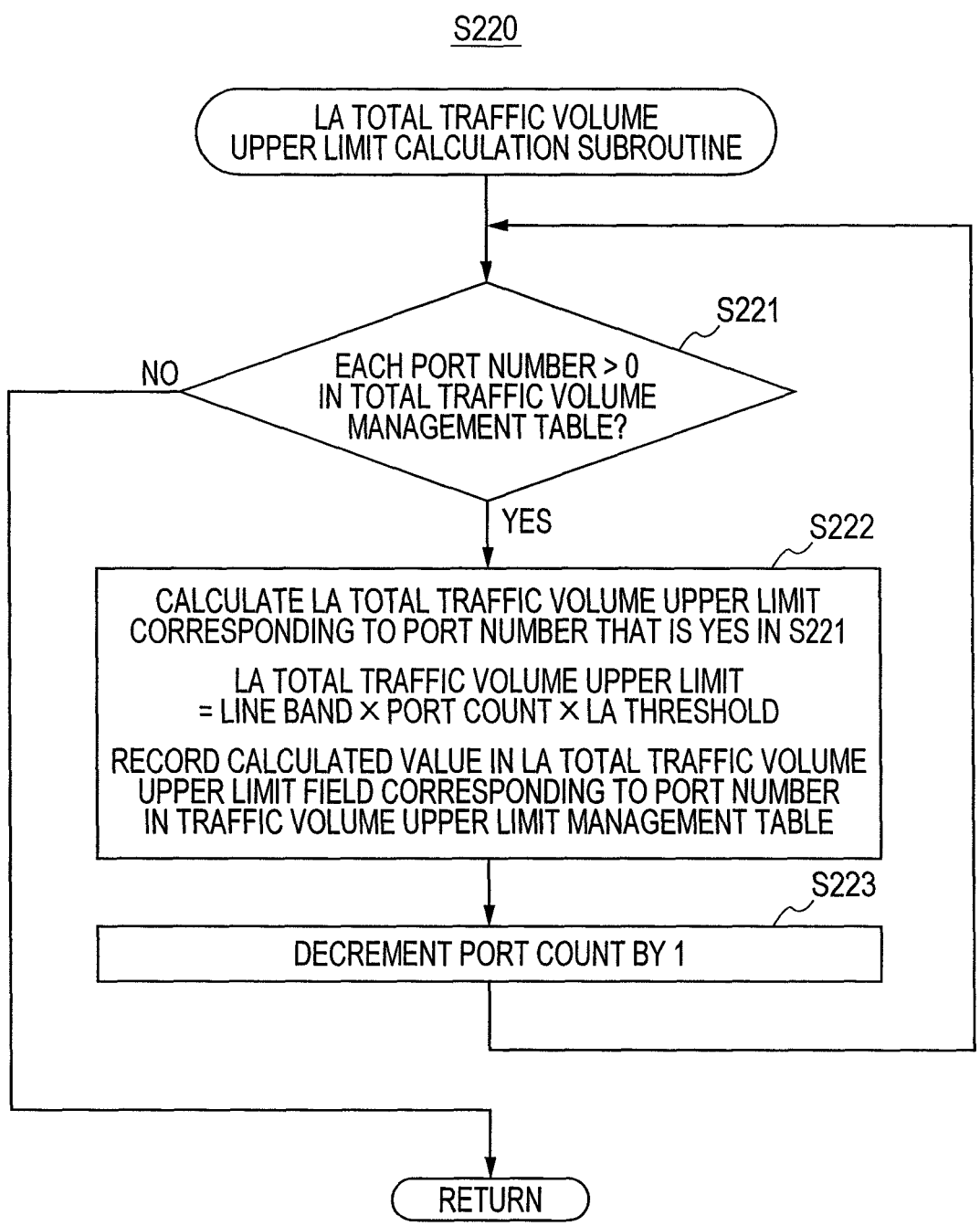
FIG. 17 is a flowchart of calculation of port count-specific traffic volume upper limits.

Referring to FIG. 17, the LA total traffic volume upper limit calculation subroutine will be described. In FIG. 17, the operation control unit 200A determines whether each port count recorded in the total traffic volume management table 280 is greater than zero (S221). If the determination in step 221 is YES with respect to one port count, the operation control unit 200A calculates an LA total traffic volume upper limit corresponding to the port count using Formula 1 on the basis of an LA threshold set up by the user.

$$\text{LA total traffic volume upper limit} = \text{line band} \times \text{port count} \times \text{LA threshold} \qquad \text{Formula 1}$$

The operation control unit 200A records the calculated upper limit in the LA total traffic volume upper limit 324 corresponding to the port count in the traffic volume upper limit management table 320 (S222). The operation control unit 200A decrements the port count by one (S223) and performs step 221 again. If the determination in step 221 is NO, the operation control unit 200A returns to the process flow. Although omitted to simplify the figure, the operation control unit 200A performs the above-mentioned process with respect to all the LA numbers and then returns to the process flow.

Figure 18:
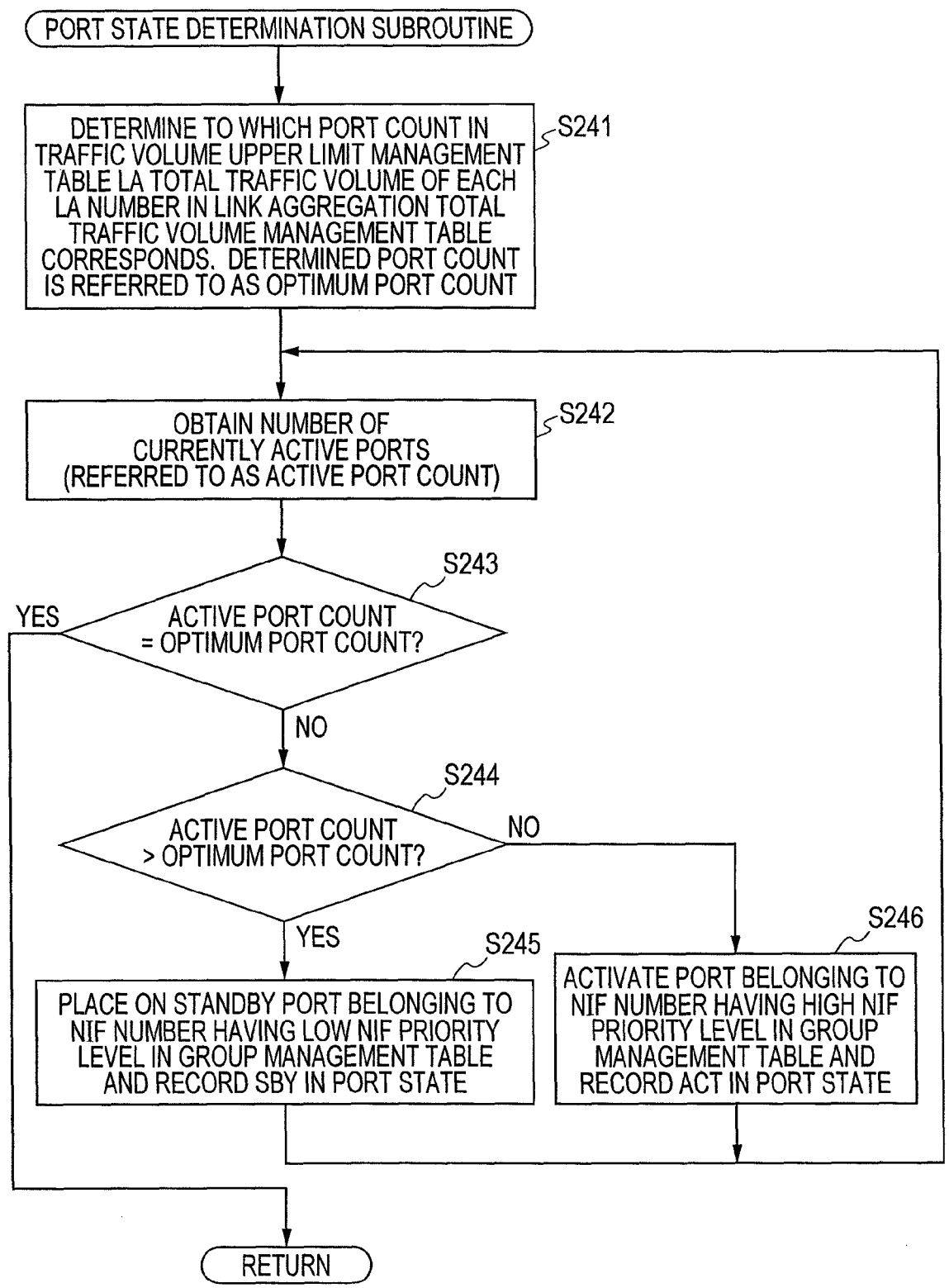
FIG. 18 is a flowchart of a link aggregation port state determination subroutine.

Referring to FIG. 18, the port state determination subroutine will be described. In FIG. 18, the operation control unit 200A determines to which port count in the traffic volume upper limit management table 320 the LA total traffic volume of each link aggregation number in the link aggregation total traffic volume management table 280 corresponds (S241). This port count will be referred to as an "optimum port count." The operation control unit 200A then obtains the number of the currently active ports (S242). This port count will be referred to as an "active port count." The operation control unit 200A determines whether the active port count is equal to the corresponding optimum port count (S243). If the determination in step 243 is NO, the operation control unit 200A further determines whether the active port count is greater than the optimum port count (S244). If the determination in step 244 is YES, the operation control unit 200A places on standby (powers off) a port belonging to an NIF number having a low NIF priority level in the group management table 340 and records SBY in the port state 310 of the port (S245), and then moves back to step 242.

In contrast, if the determination in step 244 is NO, the operation control unit 200A activates (powers on) port belonging to an NIF number having a high NIF priority level in the group management table 340 and records ACT in the port state 310 of the port (S246), and then moves back to step 242. If the determination in step 243 is YES, the operation control unit 200A returns to the process flow.

The ports 700 are powered on or off by the hardware control unit 500 in accordance with an instruction from the operation control unit 200A.

In the NIF state determination subroutine A (S120A) shown in FIG. 16, the port management table 240 in the NIF state determination subroutine A (S120) shown in FIG. 7 is replaced with the port traffic management table 300, and the group management table 260 with the group management table 340.

According to this embodiment, there can be provided a packet relay device that includes redundant multiple network interfaces forming multiple link aggregations and that controls standby power consumed by standby network interfaces in accordance with a change in traffic volume.

[Third Embodiment]

A third embodiment of the present invention will be described with reference to FIGS. 19 to 27. In the third embodiment, an operation control unit 200B of the packet relay device 10 uses a port check status management table 400 and a group management table 420, and the hardware control unit 500 uses a check result management table 520 and a check criteria table 540. Thus, the packet relay device 10 reduces the communication interruption time caused by intermittent occurrence of failures in active ports and therefore performs control so that the ports and the network interfaces are placed in the optimum state.

Figure 19:
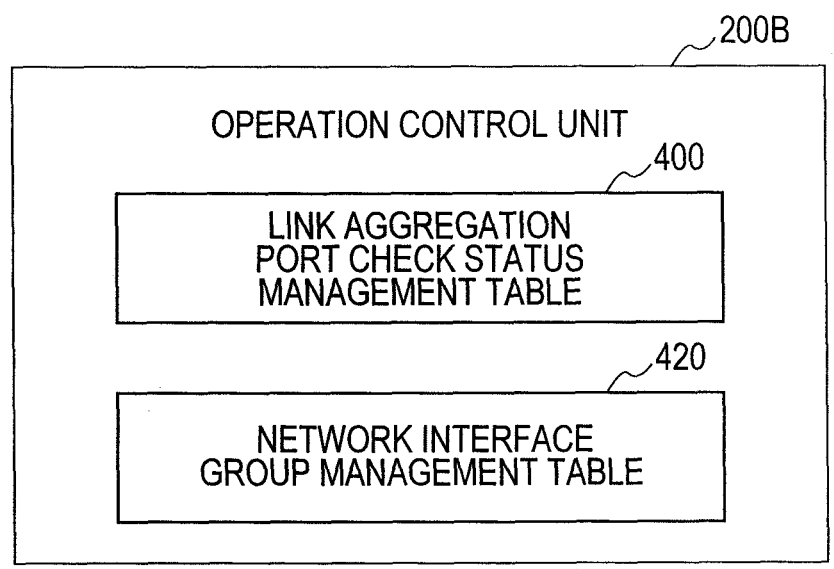
FIG. 19 is a diagram showing the structure of an operation control unit.

First, referring to FIG. 19, the operation control unit 200B will be described in detail. In FIG. 19, the operation control unit 200B holds the link aggregation port check status management table 400 and the network interface group management table 420. The operation control unit 200B refers to the link aggregation port check status management table 400 and the network interface group management table 420 so as to determine the states of ports belonging to each link aggregation.

Figure 20:
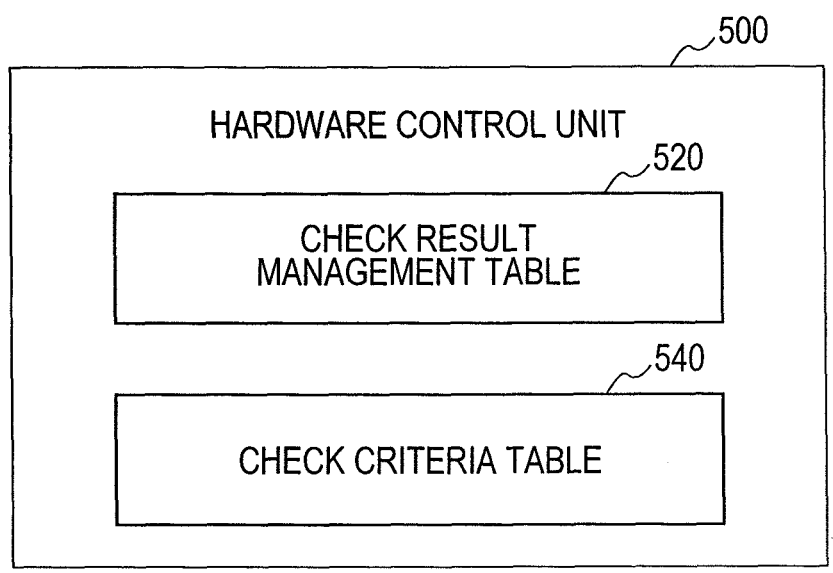
FIG. 20 is a diagram showing the structure of a hardware control unit.

Referring to FIG. 20, the hardware control unit 500 will be described in detail. In FIG. 20, the hardware control unit 500 holds the check result management table 520 and the check criteria table 540. The hardware control unit 500 refers to the check criteria table 540 to check the state of a hardware component corresponding to a check item and incorporates the check result into the check result management table 520.

Referring to FIG. 21, the link aggregation port check status management table 400 will be described. In the link aggregation port check status management table 400 shown in FIG. 21, quality check statuses are managed by port. The port check status management table 400 includes an LA number 402, an NIF number 404, a port number 406, a port state 408, and a check status 410. A check status 410 has a value "CHECKED" or a value "UNCHECKED," which indicates whether a port has been checked.

Referring to FIG. 22, the network interface group management table 420 will be described. In the network interface group management table 420 shown in FIG. 22, pieces of information about the redundant network interfaces are managed. The group management table 420 includes an NIF group number 422, an NIF number 424, an NIF priority level 426, presence or absence of an unstable port 428, and an NIF state 430. An NIF priority level 426 represents the priority level of one of the redundant multiple network interfaces. Presence or absence of the unstable port 428 indicates whether an NIF number has a port that cannot ensure stable quality.

Referring to FIG. 23, the check result management table 520 will be described. In FIG. 23, the check result management table 520 includes a check item 522, an actually measured value 524, an occurrence frequency 526, and a check result 528. A check item 522 is used in order to determine quality. An actually measured value 524 represents a value obtained by making an actual measurement with respect to a check item. An occurrence frequency 526 is the frequency with which it has been determined that an actual measurement result is abnormal. A check result 528 represents a determination made in comparison with the check criteria table 540. Note that FIG. 23 shows only description about the NIF number 1 and the port number 1.

Referring to FIG. 24, the check criteria table 540 will be described. In FIG. 24, the check criteria table 540 includes a check item 542, a normal value 544, and an allowable occurrence frequency 546. A check item 542 here is the same as the check item 522 shown in FIG. 23. A normal value 544 represents the normal value range of a check item. An allowable occurrence frequency 546 represents the frequency with which a value outside the normal value range is allowed to occur. The user may change any check item, normal value, or allowable occurrence frequency in the configuration or the like, as necessary.

Figure 25:
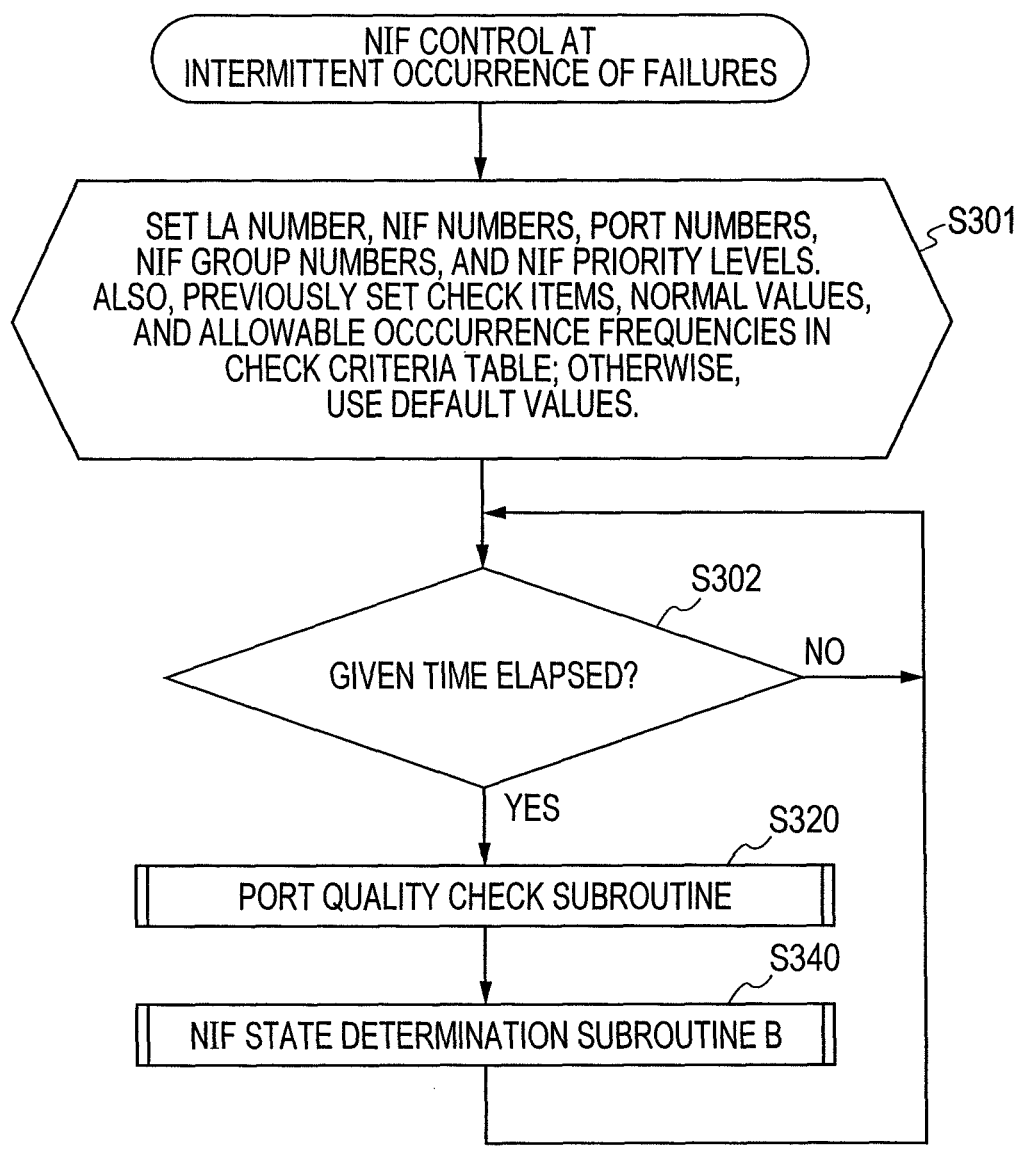
FIG. 25 is a flowchart of a process of controlling network interfaces when a failure occurs intermittently.

Referring to FIG. 25, the process flow will be described. In FIG. 25, the user sets up the configuration of the device so that the ports and the network interfaces are made redundant. To set up a link aggregation for making ports redundant requires setting of an LA number by which the link aggregation is identified and NIF numbers and port numbers belonging to the LA number. To make network interfaces redundant requires setting of an NIF group number by which the network interfaces are grouped and identified, NIF numbers which are the numbers of the network interfaces belonging to the NIF group number, and NIF priority levels on the basis of which the network interfaces will be placed on standby. Further, check items for determining the quality of the ports, and normal values and allowable occurrence frequencies with respect to the check items are set as necessary.

The command analysis unit 100 analyzes these pieces of configuration information. The command analysis unit 100 notifies the operation control unit 200B of the LA numbers, the NIF numbers, the port numbers, the NIF group numbers, and the NIF priority levels. The command analysis unit 100 also notifies the hardware control unit 500 of the check items, the normal values, and the allowable occurrence frequencies. Upon these notifications, the operation control unit 200B and the hardware control unit 500 start the process flow. The units 200B and 500 incorporate these pieces of information into the port check status management table 400, the group management table 420, and the check criteria table 540 (S301).

The operation control unit 200B then determines whether a given time has elapsed (S302). If the determination in step 302 is NO, the operation control unit 200B returns to step 302. If the determination in step 302 is YES, the operation control unit 200B performs a subroutine for checking the quality of all the ports (S320). The operation control unit 200B then returns from the quality check subroutine and performs a network interface state determination subroutine on the basis of the check result (S340). The operation control unit 200B then returns from the NIF state determination subroutine and moves back to step 302.

Figure 26:
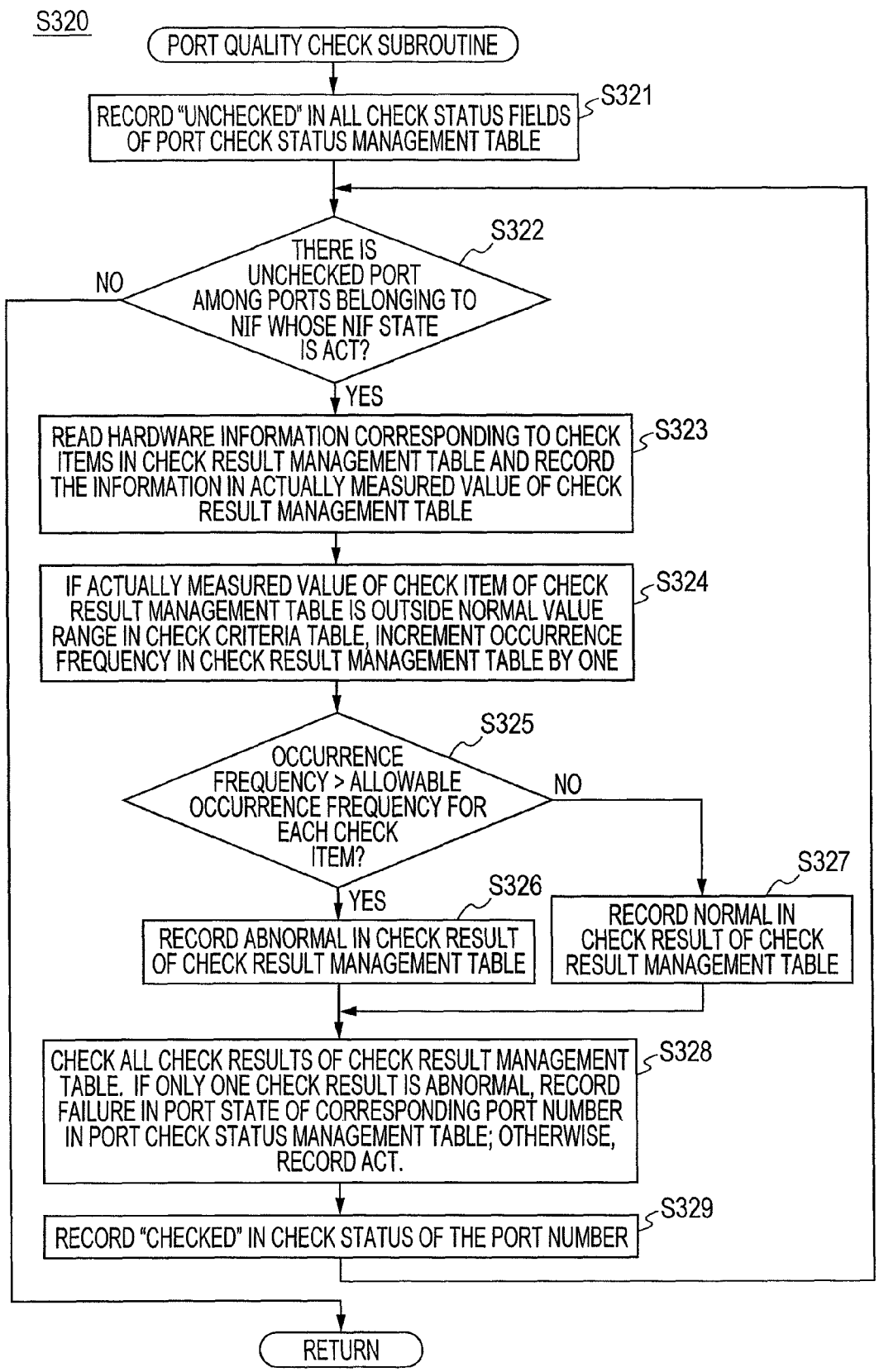
FIG. 26 is a flowchart of a port quality check process.

Referring to FIG. 26, the flow of the process of checking the quality of the ports will be described. In FIG. 26, the operation control unit 200B records UNCHECKED in all the check status 410 fields of the port check status management table 400 (S321). The operation control unit 200B then determines, on the basis of the port check status management table 400 and the group management table 420, whether there is a port number whose check status is UNCHECKED and, if there is such a port number, determines whether the NIF state of an NIF number to which the port number belongs is ACT (S322). If the determination in step 322 is YES, the operation control unit 200B requests the hardware control unit 500 to check the quality of a port having the port number. The hardware control unit 500 reads pieces of hardware information corresponding to the check items in the check result management table 520 and records the pieces of information in the actually measured value 524 (S323). If the actually measured value of a check item in the check result management table 520 is outside the corresponding normal value range in the check criteria table 540, the hardware control unit 500 increments the corresponding occurrence frequency by one (S324). The hardware control unit 500 determines whether the occurrence frequency is greater than the corresponding allowable occurrence frequency (S325). If the determination in step 325 is YES, the hardware control unit 500 records ABNORMAL in the check result 528 (S326).

If the determination in step 325 is NO, the hardware control unit 500 records "NORMAL" in the check result 528 (S327). After step 326 or step 327, the hardware control unit 500 checks the check results with respect to all the check items. Even if only one check result is ABNORMAL, the hardware control unit 500 notifies the operation control unit 200B that the port is abnormal. If all the check results are NORMAL, the hardware control unit 500 notifies the operation control unit 200B that the port is normal. If the port is abnormal, the operation control unit 200B records "FAILURE" in the port state 408 of the port in the port check status management table 400. If the port is normal, the operation control unit 200B records ACT (S328). Finally, the operation control unit 200B records "CHECKED" in the check status 410 of the port (S329). The operation control unit 200B performs the above-mentioned process with respect to all the ports. When CHECKED is recorded in all the check status 410 fields of the port check status management table 400 (S322: NO), the operation control unit 200B completes the port quality check process and returns to the process flow.

Figure 27:
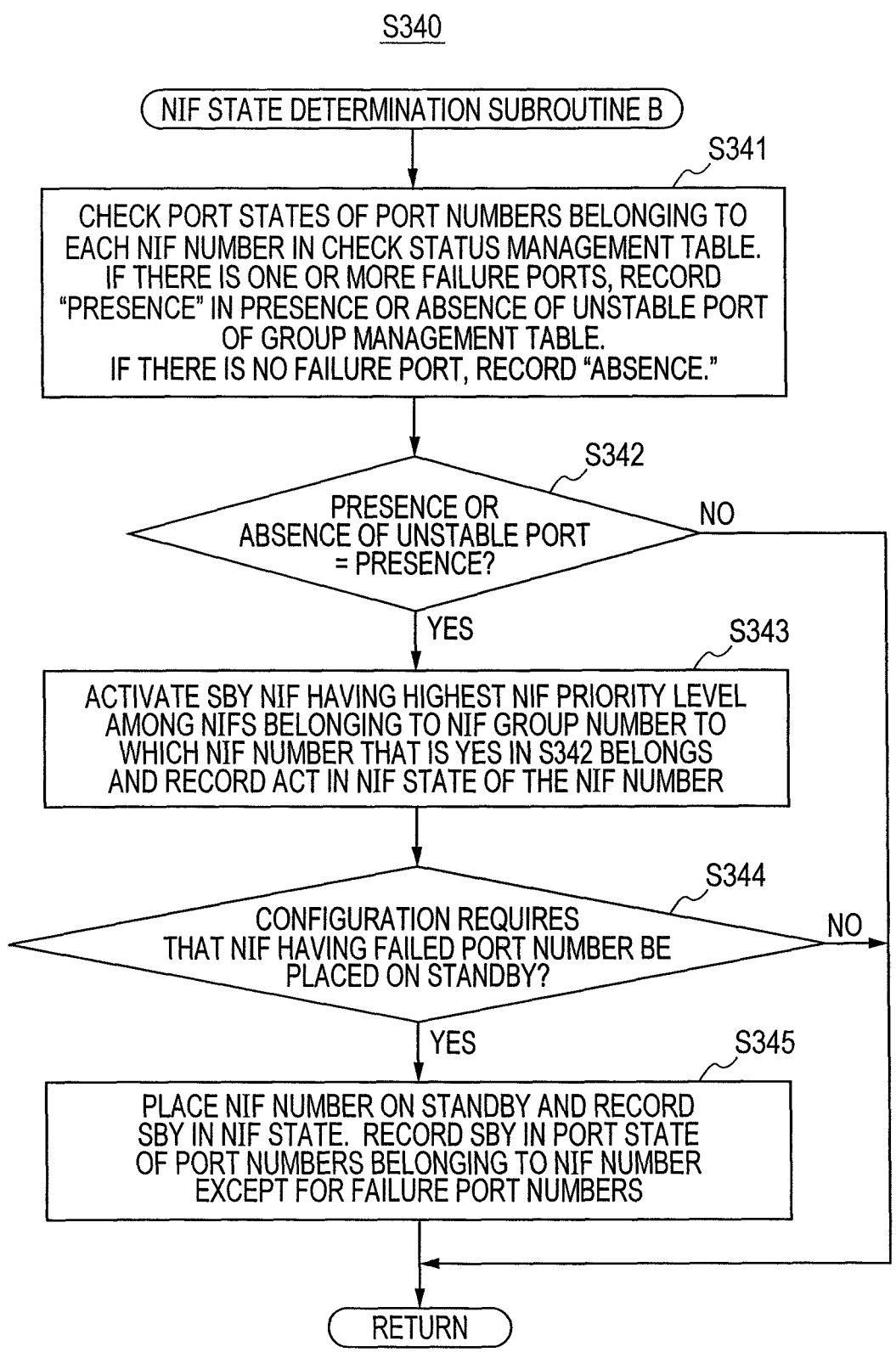
FIG. 27 is a flowchart of a network interface state determination subroutine B.

Referring to FIG. 27, the flow of the process of determining the states of the redundant network interfaces 40 will be described. In FIG. 27, the operation control unit 200B checks the port states of port numbers belonging to each NIF number in the port check status management table 400. If the port states of one or more ports belonging to one NIF number are FAILURE, the operation control unit 200B records "PRESENCE" in the presence or absence of unstable port 428 of the NIF number in the group management table 420. If no port state is FAILURE, the operation control unit 200B records "ABSENCE" (S341). The operation control unit 200B then determines whether any NIF number has "PRESENCE" in the presence or absence of unstable port 428 (S342). If the determination in step 342 is YES, the operation control unit 200B activates an NIF number having the highest NIF priority level and having an NIF state of SBY among NIF numbers belonging to an NIF group number to which the NIF number having a unstable port belongs and records ACT in the NIF state 430 of the activated NIF number (S343). The operation control unit 200B then determines whether the configuration requires that an NIF number having a failed port number be placed on standby (S344). If the determination in step 344 is YES, the operation control unit 200B instructs the hardware control unit 500 to place the NIF number having an unstable port on standby and records SBY in the NIF state 430 of the NIF number. The operation control unit 200B records SBY in the port state 408 of all port numbers belonging to the NIF number except for port numbers whose port state is FAILURE (S345). If the determination in step 344 is NO, the operation control unit 200B completes the NIF state determination process and returns to the process flow. Similarly, if the determination in step 342 is NO, the operation control unit 200B completes the NIF state determination process and returns to the process flow.

According to this embodiment, the activation and deactivation of standby network interfaces due to intermittent occurrence of failures in a port of an active network interface are restrained. This can reduce the communication interruption time.

[Fourth Embodiment]

A fourth embodiment of the present invention is a method of placing on standby or activating a redundant network interface on a scheduled data and time in combination with a schedule function of starting the operation on a data and time specified by the user, which is the related art. As in steps 151 to 155 shown in FIG. 8, occurrence of a failure in an active network interface activates a standby network interface, ensuring the continuity of the communication.

[Fifth Embodiment]

A fifth embodiment of the present invention will be described with reference to FIGS. 28 to 33. The fifth embodiment is a configuration where each packet relay device 10 monitors the connection state of the link aggregation using a protocol when connected to the opposite device. This embodiment uses the link aggregation control protocol (LACP) defined in IEEE802.3ad as the protocol.

Figures 28, 29:
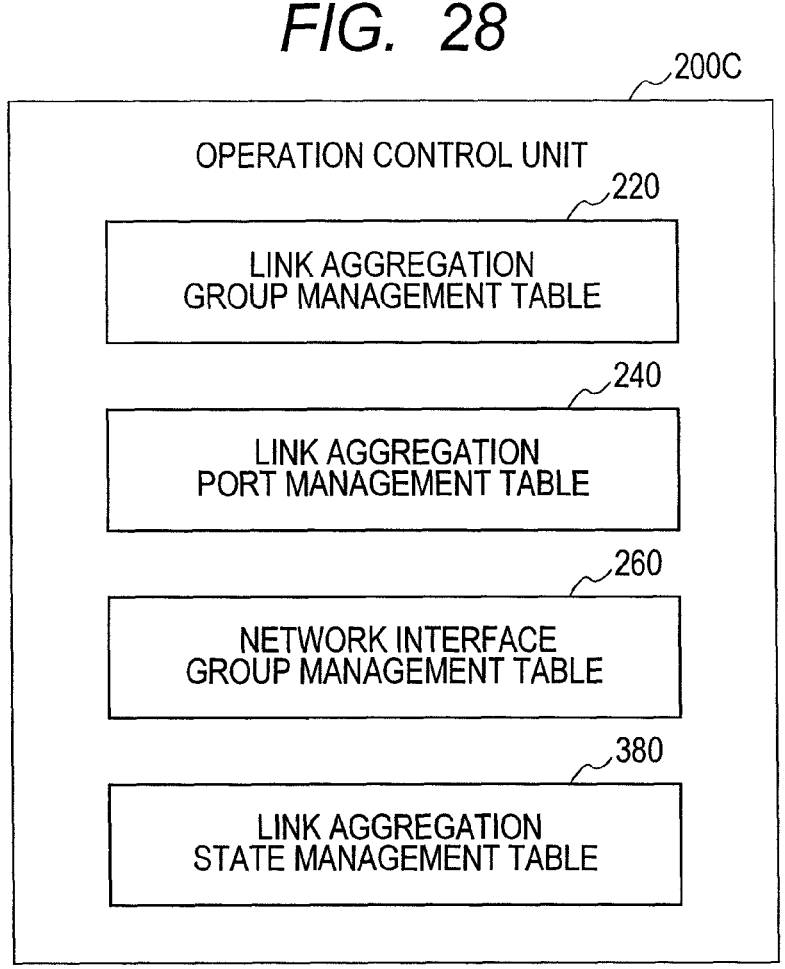
FIG. 28 is a diagram showing the structure of an operation control unit.
FIG. 29 is a diagram showing a link aggregation state management table.

Referring to FIG. 28, an operation control unit 200C according to the fifth embodiment will be described. In FIG. 28, the operation control unit 200C contains a link aggregation group management table 220, a link aggregation port management table 240, a network interface group management table 260, and a link aggregation state management table 380. The operation control unit 200C uses the tables 220, 240, 260, and 380 to control the power supply to the network interfaces 40 in accordance with the states of the ports of the link aggregations and the LACP state.

Referring to FIG. 29, the link aggregation state management table 380 will be described. In FIG. 29, the link aggregation state management table 380 includes an NIF number 382, a port number 384, and an LACP state 386. An LACP state 386 represents the link connection state between the packet relay device 10 and the opposite device. An LACP state has a value "ESTABLISHED," which indicates that packet communications can be performed or a value "UNESTABLISHED," which indicates that packet communications cannot be performed.

The user previously sets up the configuration of the packet relay device 10 so that the ports 700 and the network interfaces 40 are made redundant. To set up a link aggregation for making the ports 700 redundant requires setting of an LA number, NIF numbers and port numbers belonging to the LA number, a maximum active port count, LA priority levels, and LACP mode.

An LA number is a number by which a link aggregation is identified. A maximum active port count is the maximum number of ports that are used among ports belonging to an LA number. LA priority levels are priority levels on the basis of which ports will be placed on standby. The LACP mode is "ACTIVE mode" or "PASSIVE mode." In ACTIVE mode, the packet relay device 10 transmits an LACPDU to the opposite device regardless of the state of the opposite device. In PASSIVE mode, the packet relay device 10 transmits an LACPDU to the opposite device only when receiving an LACPDU.

If there are multiple link aggregations, it is more advantageous that specific network interfaces 40 included in the link aggregations have the same LA priority level. To set up a link aggregation for making network interfaces 40 redundant requires setting of an NIF group number by which the network interfaces are grouped and identified and NIF numbers which are the numbers of the network interfaces belonging to the NIF group number.

The command analysis unit 100 analyzes these pieces of configuration information. The command analysis unit 100 notifies the operation control unit 200C of the analysis result. Subsequently, the operation control unit 200C starts a process sequence shown in FIG. 30.

Figure 30:
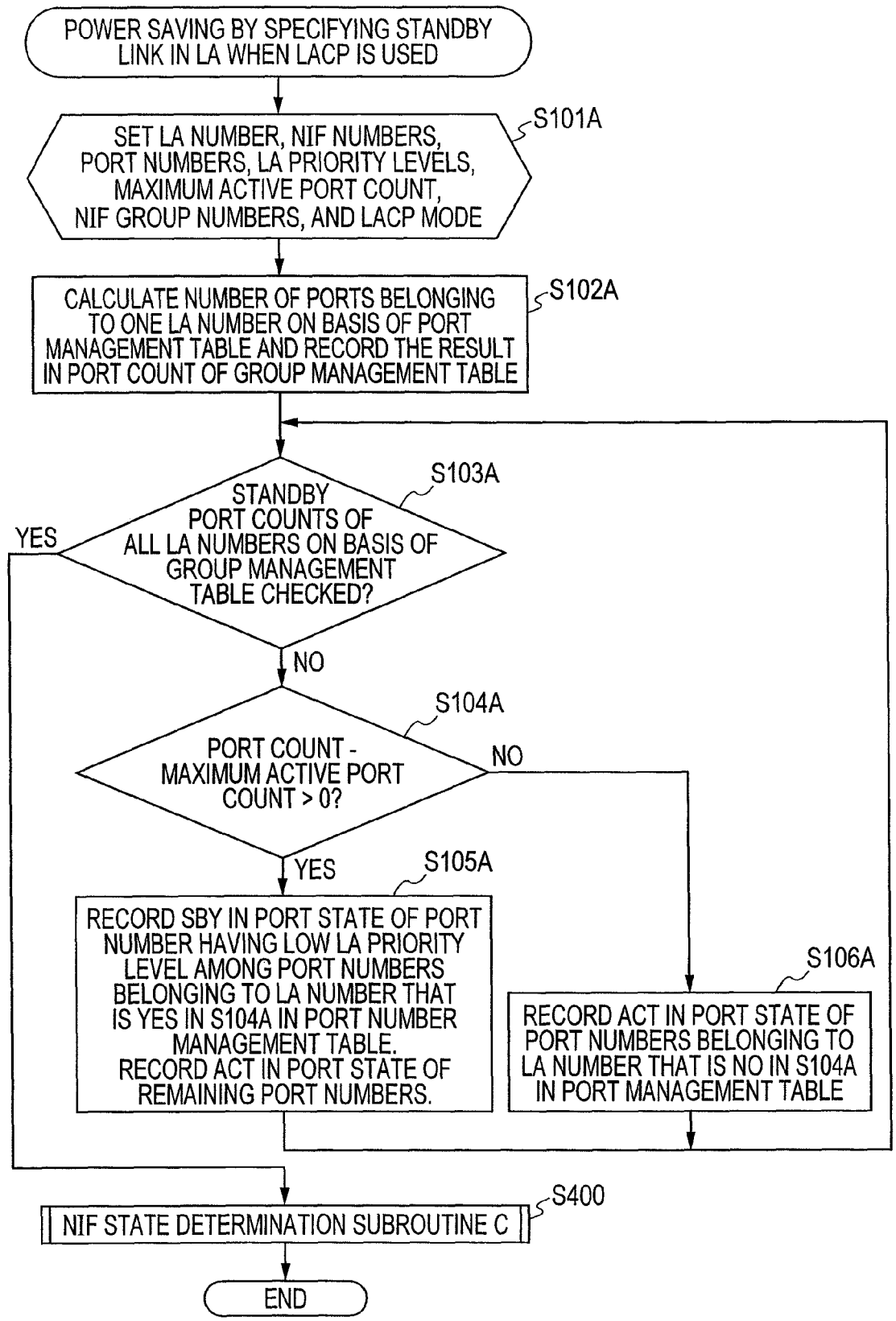
FIG. 30 is a flowchart of power saving by specifying a port in a link aggregation when an LACP is used.

In FIG. 30, the operation control unit 200C incorporates the configuration information into the group management table 220, the port management table 240, and the group management table 260 (S101A). The operation control unit 200C calculates the number of ports belonging to one LA number on the basis of the port management table 240 and records the calculated port count in the port count 224 of the group management table 220. The operation control unit 200C performs the above-mentioned process with respect to all the LA numbers (S102A).

The operation control unit 200C calculates the number of standby links among ports belonging to each link aggregation on the basis of the group management table 220 and then determines whether the standby link count has been calculated with respect to all the link aggregations (S103A). If the determination in step 103A is YES, the operation control unit 200C jumps to an NIF state determination subroutine C and then returns to the process sequence and completes it.

If the determination in step 103A is NO, the operation control unit 200C determines whether "port count−active port count >0" for each LA number, on the basis of the group management table 220 (S104A). If the determination in step 104A is YES, the operation control unit 200C regards, as a low-priority port number, a port number having an LA priority level of a large value among port numbers belonging to the LA number in the link aggregation port management table 240. The operation control unit 200C then records SBY (power-off the port) in the port state 250 of the port number. The operation control unit 200C instructs the hardware control unit 500 to place a port having the port number on standby. Thus, the hardware control unit 500 restrains the power supply to the port (S105A). In contrast, if the determination in step 104A is NO with respect to one LA number, the operation control unit 200C records ACT (linkup) in the port state 250 of a port number belonging to the LA number in the port management table 240 (S106A) and moves back to step 103A.

Figure 31:
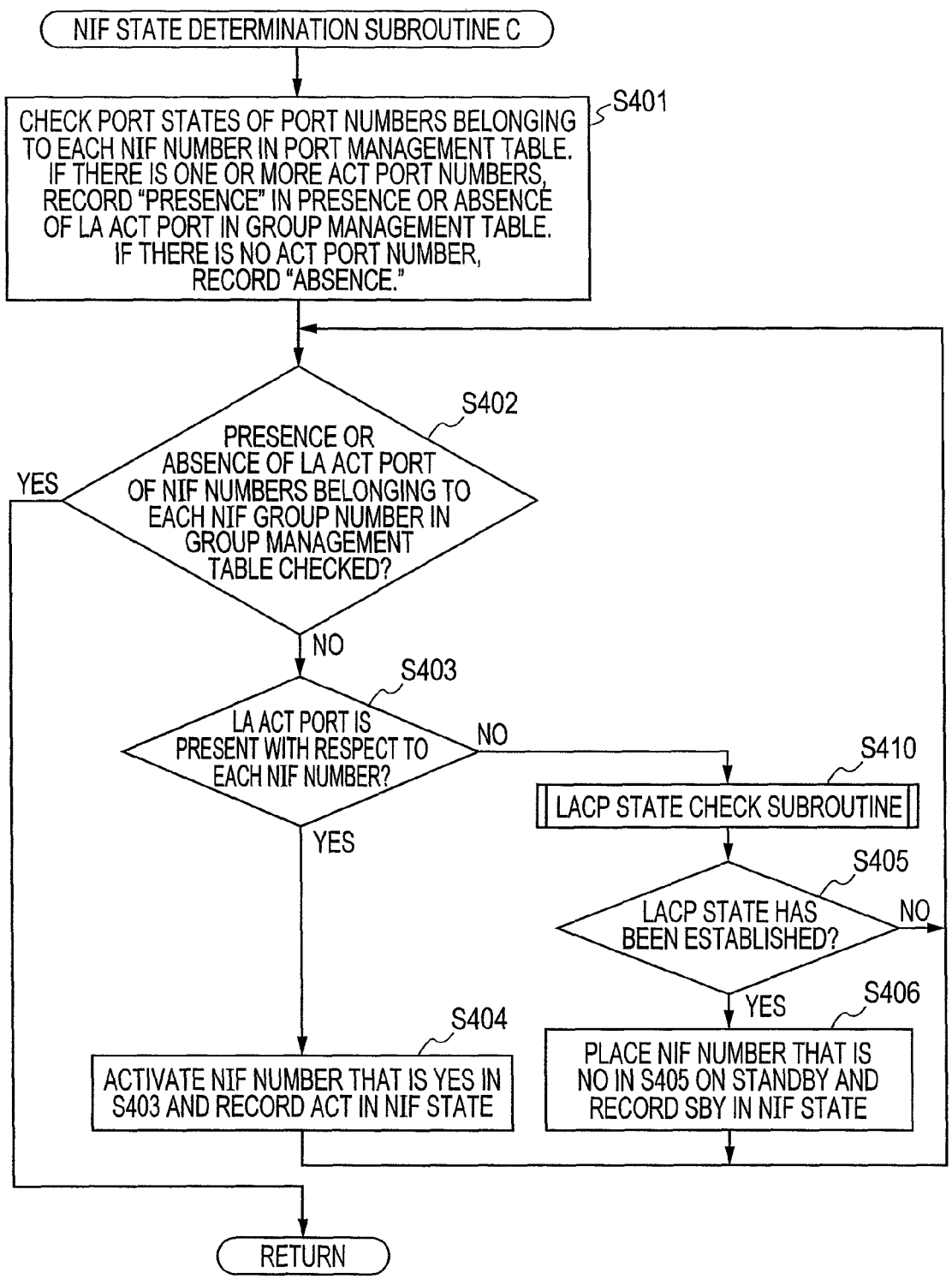
FIG. 31 is a flowchart of a network interface state determination subroutine C.

After updating the port state on the basis of the configuration of each link aggregation, the operation control unit 200C updates the states of the redundant network interfaces 40 (S400). Referring to FIG. 31, this process will be described.

In FIG. 31, the operation control unit 200C refers to the port management table 240 to check the port states of port numbers belonging to each NIF number. If an NIF number has one or more ACT port numbers, the operation control unit 200C records "PRESENCE" in the presence or absence of LA ACT port 266 of the NIF number in the group management table 260. If an NIF number has no ACT port number, the operation control unit 200C records "ABSENCE" (S401).

The operation control unit 200C determines whether the presence or absence of LA ACT port has been checked with respect to all NIF numbers belonging to each NIF group number in the group management table 260 (S402). If the determination in step 402 is YES, the operation control unit 200C returns to the process sequence.

If the determination in step 402 is NO, the operation control unit 200C determines whether "PRESENCE" is recorded in the presence or absence of LA ACT port 266 with respect to each NIF number (S403). If the determination in step 403 is YES, the operation control unit 200C activates the NIF number and records ACT in the NIF state 268 thereof (S404), and moves back to step 402. Specifically, the operation control unit 200C instructs the hardware control unit 500 to activate a network interface having the NIF number and records ACT in the NIF state 268 of the NIF number in the group management table 260. If ACT is already recorded in the NIF state 268, the operation control unit 200C does nothing.

In contrast, if "ABSENCE" is recorded in the presence or absence of LA ACT port 266 of one NIF number (S403: NO), the operation control unit 200C calls an LACP state check subroutine (S410). The operation control unit 200C then returns from the LACP state check subroutine and determines whether the LACP state has been established (S405). If the determination in step 405 is YES, the operation control unit 200C places the NIF number on standby (power-off of the NIF) and records SBY in the NIF state 268 of the NIF number (S406), and moves back to step 402. Specifically, the operation control unit 200C instructs the hardware control unit 500 to stop the power supply to the NIF number. The operation control unit 200C then records SBY in the NIF state 268 of the NIF number in the group management table 260. If SBY is already recorded in the NIF state 268, the operation control unit 200C does nothing. If the LACP state has not been established (S405: NO), the operation control unit 200C moves back to step 402.

Figure 32:
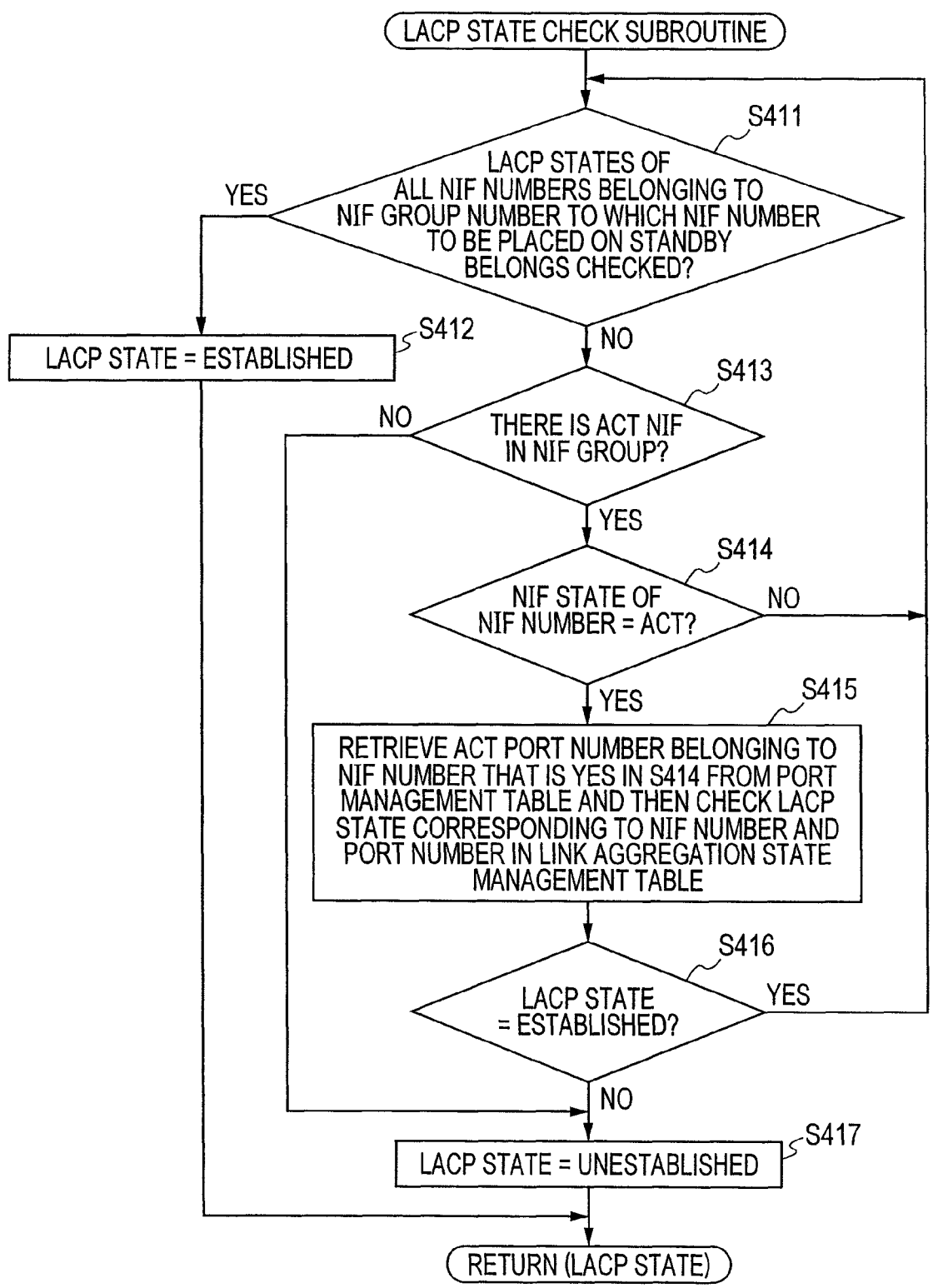
FIG. 32 is a flowchart of an LACP state check process.

Meanwhile, in the case where the LACP is used to monitor the link state between the packet relay device 10 and the opposite device, packet communications cannot be performed unless the LACP is established, even if the ports are ACT (linkup). Referring to FIG. 32, an LACP state check process for avoiding such a situation will be described.

In FIG. 32, the operation control unit 200C determines whether it has checked the LACP state of all NIF numbers belonging to an NIF group to which an NIF number to be placed on SBY belongs in the network interface group management table 260 (S411). If the determination in step 411 is YES, the operation control unit 200C determines that the LACP state is established (S412) and returns to the process sequence.

In contrast, if the determination in step 411 is NO, the operation control unit 200C checks whether the NIF group number includes NIF numbers whose NIF state is ACT except for the NIF number to be placed on SBY in the network interface group management table 260 (S413). If the determination in step 413 is YES, the operation control unit 200C checks whether there is an NIF number whose NIF state is ACT among the NIF numbers (S414). If the determination in step 414 is YES, the operation control unit 200C retrieves a port number which belongs to the NIF number and whose port state is ACT from the link aggregation port management table 240. The operation control unit 200C then checks an LACP state corresponding to the NIF number and the port number in the link aggregation state management table 380 (S415). If the LACP state is "ESTABLISHED" (S416: YES), the operation control unit 200C moves back to step 411. In contrast, if the determination in step 416 is NO, the operation control unit 200C determines that the LACP state is unestablished (S417) and returns to the process sequence. If the determination in step 413 is NO, the operation control unit 200C proceeds to step 417. If the determination in step 414 is NO, the operation control unit 200C moves back to step 411.

Figure 33:
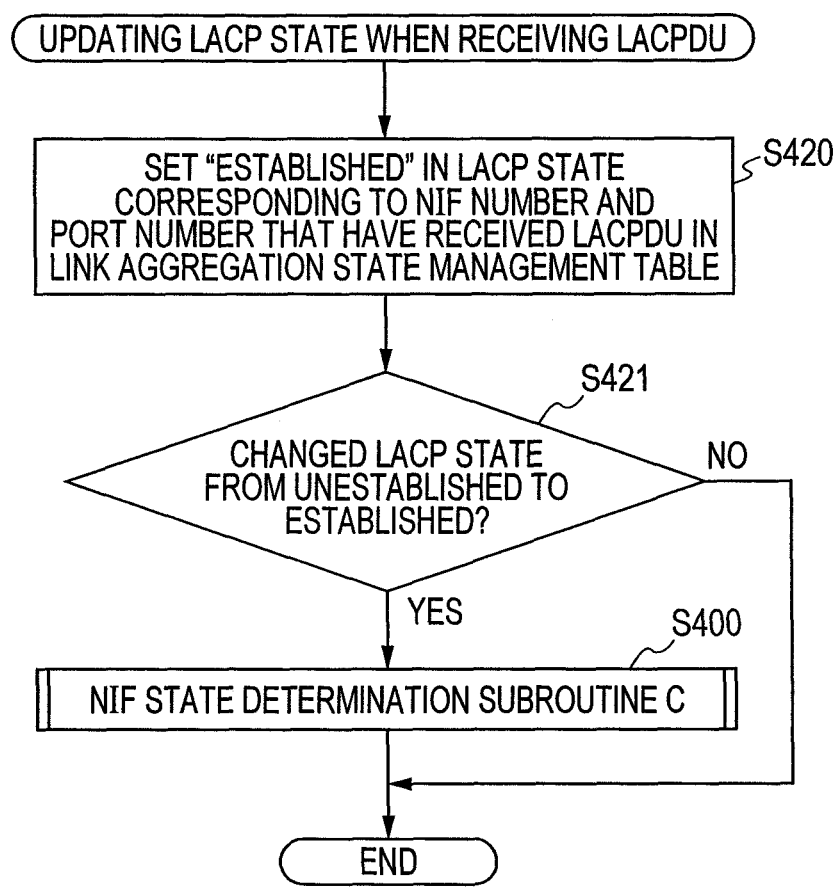
FIG. 33 is a flowchart for an LACP state update process following receipt of an LACPDU.

Referring to FIG. 33, the process that the packet relay device 10 performs when receiving an LACPDU from the opposite device will be described. In FIG. 33, the operation control unit 200C sets "ESTABLISHED" in the LACP state 386 corresponding to the NIF number and the port number that have received the LACPDU in the link aggregation state management table 380 (S420). The operation control unit 200C then checks whether the LACP state has been changed from unestablished to established states (S421). If the determination in step 421 is YES, the operation control unit 200C performs an NIF state determination subroutine C (S400), and then returns to the process and completes it. If the determination in step 421 is NO, the operation control unit 200C completes the process.

According to this embodiment, in the case where the LACP is used in a link aggregation extending over redundant network interfaces, the LACP is established in an active network interface so that the continuity of the communication is ensured, while power supply to a network interface to be placed on standby is stopped so that power can be saved. According to this embodiment, simply linking up an active network interface can avoid communication interruption that occurs when power supply to a network interface that is to be placed on standby and is being used in the communication is stopped.

[Sixth Embodiment]

A sixth embodiment of the present invention will be described with reference to FIGS. 34 to 39. In the sixth embodiment, an operation control unit 200D of the packet relay device 10 uses a link aggregation port management table 240A, a network interface failure criteria table 440, and a network interface group management table 460 so as to perform control so that the stop of power supply to a standby network interface is restrained depending on the occurrence frequency of failures in an active network interface or active port.

Figures 34, 35:
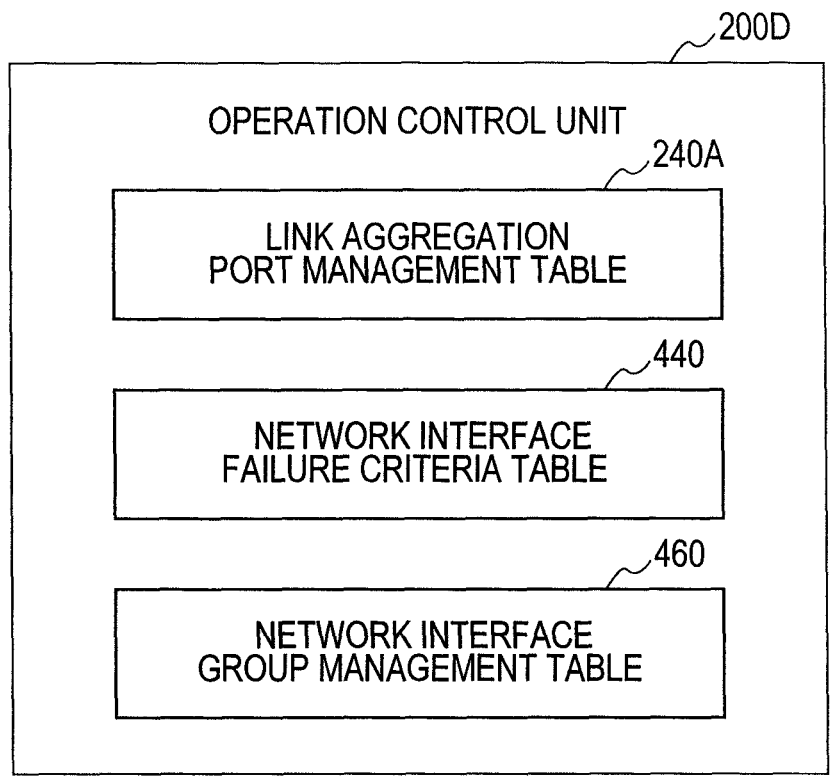
FIG. 34 is a diagram showing the structure of an operation control unit.
FIG. 35 is a diagram showing a link aggregation port management table.

First, referring to FIG. 34, the operation control unit 200D will be described. In FIG. 34, the operation control unit 200D holds the link aggregation port management table 240A, the network interface unit failure criteria table 440, and the network interface group management table 460. The operation control unit 200D refers to the tables 240A and 460 so as to determine the states of ports belonging to each link aggregation and the states of network interfaces to which the ports belong.

Referring to FIG. 35, the link aggregation port management table 240A will be described. In FIG. 35, the link aggregation port management table 240A includes an LA number 242A, an NIF number 244A, a port number 246A, an LA priority level 248A, and a port state 250A. These items are similar to what are shown in FIG. 4. The only difference between the FIG. 35 and FIG. 4 is the port state 250A.

Referring to FIG. 36, the network interface failure criteria table 440 will be described. In the network interface failure criteria table 440 shown in FIG. 36, criteria to be applied when a failure occurs in a network interface are managed. The network interface failure criteria table 440 includes a retry frequency 442 and an NIF failure allowable occurrence frequency 444. A retry frequency represents the maximum frequency of an NIF reactivation process (hereafter referred to as a "retry") to be performed as a recovery measure when a minor failure occurs in a network interface. An NIF failure allowable occurrence frequency represents the allowable frequency of an NIF failure.

Referring to FIG. 37, the network interface group management table 460 will be described. In the network interface group management table 460 shown in FIG. 37, pieces of information about redundant network interfaces are managed. The group management table 460 includes an NIF group number 462, an NIF number 464, an NIF priority level 466, an NIF state 468, an NIF failure frequency 470, and an NIF failure 472.

NIF priority levels 466 represent the priority levels of the redundant multiple network interfaces. An NIF failure frequency 470 is an item indicating the frequency of an NIF failure. If a network interface does not recover from a failure even if retries are performed with the frequency shown in the retry frequency 442, it is determined that a failure has occurred in the network interface, and the NIF failure frequency of the network interface is incremented by one. An NIF failure 472 is an item indicating whether the NIF failure frequency exceeds the NIF failure allowable occurrence frequency. When the NIF failure frequency exceeds the NIF failure allowable occurrence frequency, "1" is recorded in the NIF failure 472.

Figure 38:
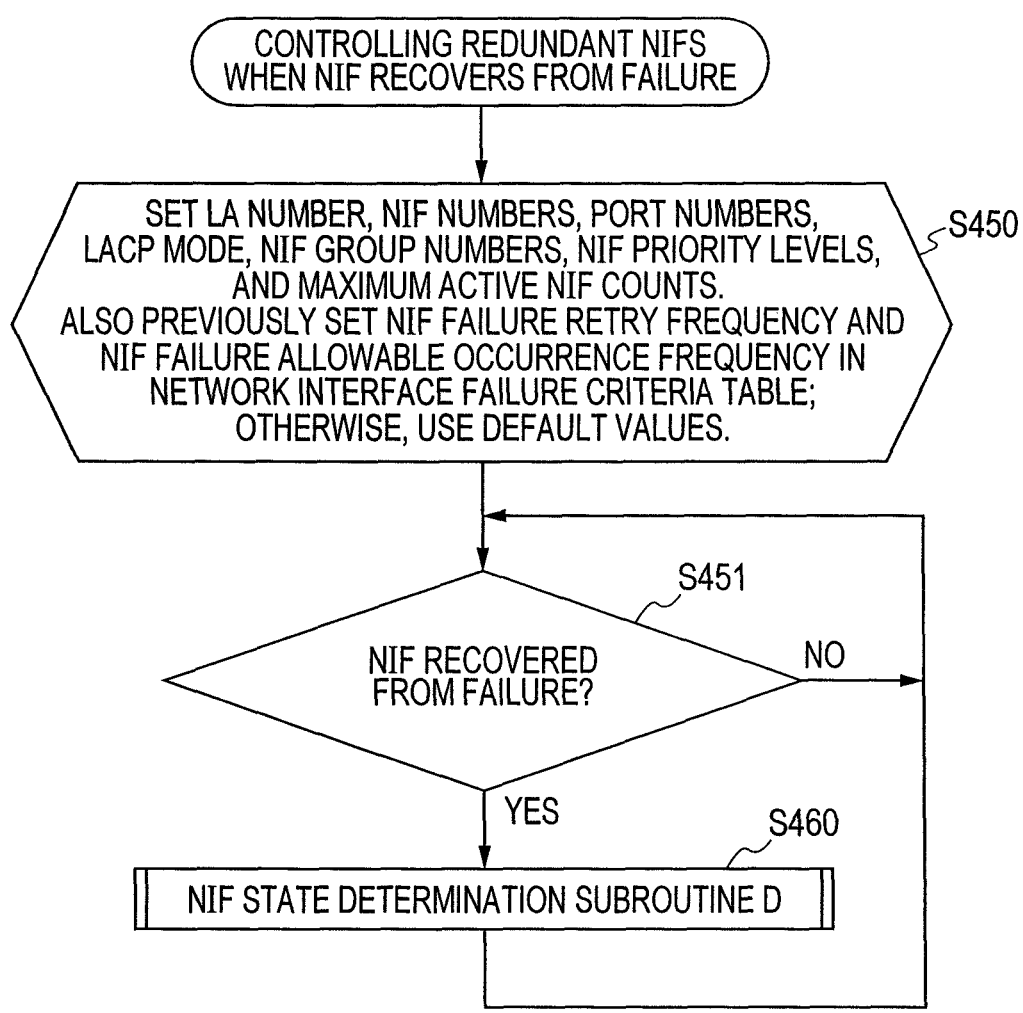
FIG. 38 is a flowchart of a redundant NIF control process following recovery of an NIF from a failure.

Referring to FIG. 38, the flow of a redundant NIF control process that the operation control unit 200D performs when a network interface recovers from a failure will be described. In FIG. 38, the user sets up the configuration of the device so that the ports and the network interfaces are made redundant. To set up a link aggregation for making ports redundant requires setting of an LA number and NIF numbers belonging to the LA number. If the LACP is used, the LACP mode also needs to be specified.

An LA number is a number by which the link aggregation is identified. The LACP mode is "ACTIVE mode" or "PASSIVE mode." In ACTIVE mode, the packet relay device 10 transmits an LACPDU to the opposite device regardless of the state of the opposite device. In PASSIVE mode, the packet relay device 10 transmits an LACPDU only when receiving an LACPDU.

To set up a link aggregation for making network interfaces redundant requires setting of an NIF group number, NIF numbers, NIF priority levels, and a maximum active NIF count.

The NIF group number is a number by which the network interfaces are grouped and identified. The NIF numbers are the numbers of the network interfaces belonging to the NIF group number. The priority levels represent priority levels on the basis of which the network interfaces will be placed on standby. The maximum active NIF count represents the maximum number of network interfaces activated among the grouped multiple network interfaces.

Further, an NIF failure retry frequency and an NIF failure allowable occurrence frequency, which are failure criteria for the network interfaces, are set as necessary.

The command analysis unit 100 analyzes these pieces of configuration information. The command analysis unit 100 notifies the operation control unit 200D of the LA number, the NIF numbers, the port numbers, the LACP mode, the NIF group number, the NIF priority levels, the maximum active NIF count, the NIF failure retry frequency, and the NIF failure allowable occurrence frequency. Upon receipt of these pieces of information, the operation control unit 200D starts the process flow shown in FIG. 38. In FIG. 38, the operation control unit 200D incorporates the pieces of information into the link aggregation port management table 240A, the network interface failure criteria table 440, and the network interface group management table 460 (S450).

The operation control unit 200D then determines whether the failed network interface has recovered (S451). If the determination in step 451 is NO, the operation control unit 200D returns to step 451. The determination in step 451 is made on the basis of a periodic process in a given time, an interrupt notification from the hardware control unit 500, or the like. If the determination in step 451 is YES, the operation control unit 200D performs a network interface state determination subroutine (S460). The operation control unit 200D then returns from the NIF state determination subroutine and moves back to step 451.

Figure 39:
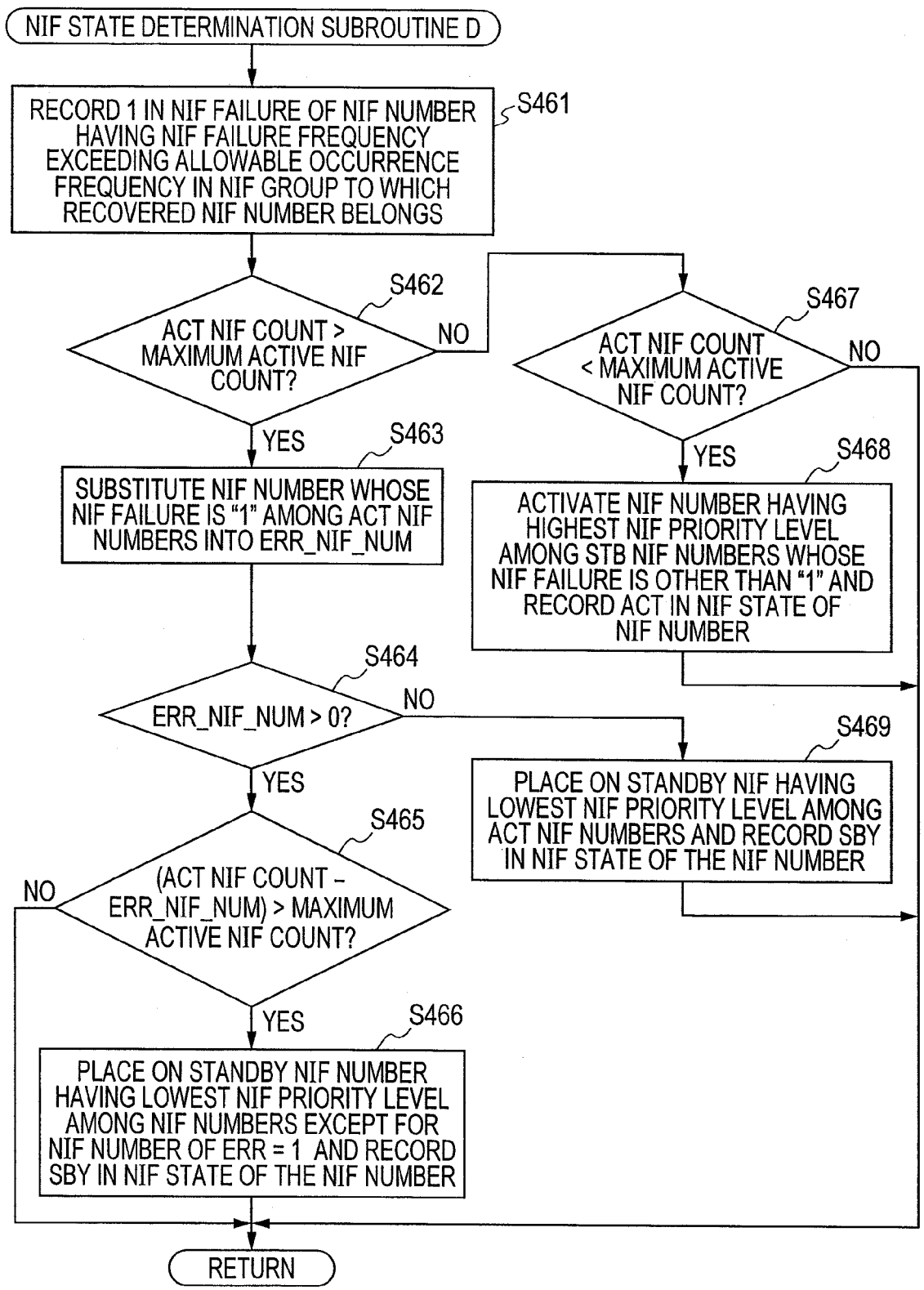
FIG. 39 is a flowchart of a network interface state determination subroutine D.

Referring to FIG. 39, the flow of the process of determining the states of the redundant network interfaces 40 will be described. In FIG. 39, the operation control unit 200D records "1" in the NIF failure 472 of an NIF number having an NIF failure frequency exceeding the NIF failure allowable occurrence frequency among NIF numbers belonging to an NIF group number to which the recovered NIF number belongs in the network interface group management table 460 (S461). The operation control unit 200D then counts the number of NIF numbers whose NIF state is ACT and determines whether the number of ACT Network interfaces is greater than the maximum active NIF count (S462). If the determination in step 462 is YES, the operation control unit 200D substitutes, into ERR_NIF_NUM, an NIF number having "1" in the NIF failure 472 among the NIF numbers whose NIF state is ACT (S463). The operation control unit 200D determines whether ERR_NIF_NUM is greater than zero (S464). If the determination in step 464 is YES, the operation control unit 200D determines whether the difference between the number of ACT network interfaces and ERR_NIF_NUM is greater than the maximum active NIF count (S465). If the different is greater than zero (S465: YES), the operation control unit 200D places on standby an NIF number having the lowest NIF priority level among NIFs having a value other than "1" in the NIF failure 472 and records SBY in the NIF state 468 of the NIF number, and returns to the redundant NIF control process. If the determination in step 465 is NO, the operation control unit 200D returns to the redundant NIF control process.

If the determination in step 462 is NO, the operation control unit 200D determines whether the number of ACT NIFs is smaller than the maximum active NIF count (S467). If the determination in step 467 is YES, the operation control unit 200D activates an NIF number having the highest NIF priority level (the smallest value) among NIF numbers whose NIF state is SBY and which have a value other than "1" in the NIF failure 472 among NIF numbers belonging to each NIF group number and records ACT in the NIF state 468 of the NIF number (S468), and returns to the redundant NIF control process. If the determination in step 467 is NO, the operation control unit 200D returns to the redundant NIF control process without doing anything.

If the determination in step 464 is NO, the operation control unit 200D places on standby an NIF having the lowest NIF priority level among the NIF numbers whose NIF state is ACT and records SBY in the NIF state 468 of the NIF number, and returns to the redundant NIF control process.

According to this embodiment, a network interface having an NIF failure frequency exceeding the NIF failure allowable frequency is not handled as an active network interface. Thus, even if a failure occurs in the network interface intermittently, power saving as well as a reduction in communication interruption time can be achieved.

This embodiment can be combined with the fifth embodiment by regarding an network interface having a failure frequency exceeding the allowable frequency as an NIF failure in the process flow for addressing intermittent occurrence of a failure in a port, shown in the third embodiment.

What is claimed is:

1. A packet relay device connected to a plurality of networks, comprising:
   a plurality of network interfaces configured to transmit or receive packets to or from the networks the plurality of network interfaces each being configured to include more than one of a plurality of ports which, in different network interfaces, are configured to provide a link aggregation as a single virtual line with the networks;
   a packet transfer unit configured to determine a transfer destination of a packet received via one of the network interfaces on the basis of header information of the packet and to transfer the packet to one of the network interfaces; and
   a device control unit including:
   an operation control unit configured to set ports, including ports in different network interfaces which provide the link aggregation, to be placed on an active or standby status, to check a status of the ports included by one network interface specified among the network interfaces which provide the link aggregation to determine whether there is any active port in the specified network interface, and to place the specified network interface on standby if it is determined that the specified network interface of the network interfaces includes no active port as a result of the check; and,
   a hardware control unit configured to reduce power supply to the network interface when the specified network interface is placed on standby by the operation control unit.

2. The packet relay device according to claim 1, wherein the operation control unit is further configured to calculate a traffic volume upper limit in accordance with the number of ports belonging to each of the link aggregations on the basis of a threshold, to compare the sum of traffic volumes of ports belonging to each link aggregation with the upper limit, the sum of traffic volumes being measured in a predetermined period, to select an optimum port count according to the measured sum of traffic volumes, and to change power supply to the ports belonging to the link aggregations so that the number of active ports is equal to the optimum port count.

3. The packet relay device according to claim 1, wherein:
   at least two of the network interfaces are either an active redundant network interface and a standby redundant network interface,
   the hardware control unit is configured to perform a check on the quality of the ports in a given period on the basis of a normal value range and an allowable occurrence frequency, the allowable occurrence frequency being the frequency with which an abnormality is allowed to occur, the normal value range and the allowable occurrence frequency being criteria of check items, the check items being check items with which the quality of the ports included in the link aggregations is checked, and if the check reveals that a port belonging to an active redundant network interface is abnormal, the hardware control unit is configured to activate a standby network interface and then places the active network interface on standby.

4. The packet relay device according to claim 3, further comprising:
   means for changing the normal value range and the allowable occurrence frequency.

5. The packet relay device according claim 1, wherein:
   at least two of the network interfaces are either an active redundant network interface and a standby redundant network interface,
   activation and deactivation of the redundant network interfaces are controlled on a specified date and time.

6. The packet relay device according to claim 2, wherein:
   at least two of the network interfaces are either an active redundant network interface and a standby redundant network interface,
   activation and deactivation of the redundant network interfaces are controlled on a specified date and time.

7. The packet relay device according to claim 3, wherein:
   at least two of the network interfaces are either an active redundant network interface and a standby redundant network interface,
   activation and deactivation of the redundant network interfaces are controlled on a specified date and time.

8. The packet relay device according to claim 1, wherein:
at least two of the network interfaces are either an active redundant network interface and a standby redundant network interface,
in the case where the packet relay device comprises a plurality of packet relay devices and where a network configuration is employed where a connection state of the link aggregations connecting the packet relay devices is monitored using a protocol, the operation control unit is configured to check that a port of an active redundant network interface is linked up and that communications can be performed using the protocol and then places the active network interface on standby.

9. The packet relay device according to claim 8, wherein, when the operation control unit receives a packet for checking the connection state of the link aggregations using the protocol from the opposite packet relay device so that the connection state is changed to a state where communications can be performed, the operation control unit is configured to place the active network interface on standby.

10. The packet relay device according to claim 2, wherein:
at least two of the network interfaces are either an active redundant network interface and a standby redundant network interface,
the operation control unit is configured to determine the quality of the network interfaces on the basis of a criterion value and an allowable occurrence frequency, the criterion value representing the maximum frequency with which a recovery process is performed when a failure occurs in a redundant network interface, the allowable occurrence frequency being the frequency with which an abnormality is allowed to occur in a network interface, and
when determining that an active redundant network interface is abnormal, the operation control unit is configured to activate a standby network interface among network interfaces other than the active redundant network interface and to place the active redundant network interface on standby.

11. The packet relay device according to claim 2, wherein:
at least two of the network interfaces are either an active redundant network interface and a standby redundant network interface,
the hardware control unit is configured to detect statistic information and a failure, and,
the operation control unit is configured to determine the quality of the network interfaces on the basis of a criterion value and an allowable occurrence frequency, the criterion value representing the maximum frequency with which a recovery process is performed when a failure occurs in a redundant network interface, the allowable occurrence frequency being the frequency with which an abnormality is allowed to occur in a network interface, and
when determining that an active redundant network interface is abnormal, the operation control unit is configured to activate a standby network interface among network interfaces other than the active redundant network interface and to place the active redundant network interface on standby.

12. The packet relay device according to claim 3, wherein the operation control unit is configured to determine the quality of the network interfaces on the basis of a criterion value and an allowable occurrence frequency, the criterion value representing the maximum frequency with which a recovery process is performed when a failure occurs in a redundant network interface, the allowable occurrence frequency being the frequency with which an abnormality is allowed to occur in a network interface, and
when determining that an active redundant network interface is abnormal, the operation control unit is configured to activate a standby network interface among network interfaces other than the active redundant network interface and to place the active redundant network interface on standby.

13. The packet relay device according to claim 4, wherein the operation control unit is configured to determine the quality of the network interfaces on the basis of a criterion value and an allowable occurrence frequency, the criterion value representing the maximum frequency with which a recovery process is performed when a failure occurs in a redundant network interface, the allowable occurrence frequency being the frequency with which an abnormality is allowed to occur in a network interface, and
when determining that an active redundant network interface is abnormal, the operation control unit is configured to activate a standby network interface among network interfaces other than the active redundant network interface and to place the active redundant network interface on standby.

14. The packet relay device according to claim 1, wherein:
the hardware control unit is configured to detect statistic information and a failure, to monitor whether a failure has occurred in an active second network interface of the redundant network interfaces and, if a failure is detected, and, to notify the operation control unit of the failure, and
the operation control unit is configured to activate the standby first network interface and to place on standby the failed second network interface or a failed port thereof.

15. The packet relay device according to claim 1,
a command analysis unit is configured to analyze a device configuration command;
an operation control unit incorporates a command analysis result and to determine an appropriate power state on the basis of the state of hardware.

16. The packet relay device according to claim 3, further comprising:
means for, when the frequency with which an abnormality has occurred in a port exceeds the allowable occurrence frequency, handling a network interface to which the port belongs, as an abnormal network interface.

17. The packet relay device according to claim 10, further comprising:
means for, when the frequency with which an abnormality has occurred in a port exceeds the allowable occurrence frequency, handling a network interface to which the port belongs, as an abnormal network interface.

18. The packet relay device according to claim 11, further comprising:
means for, when the frequency with which an abnormality has occurred in a port exceeds the allowable occurrence frequency, handling a network interface to which the port belongs, as an abnormal network interface.

19. The packet relay device according to claim 12, further comprising:
means for, when the frequency with which an abnormality has occurred in a port exceeds the allowable occurrence frequency, handling a network interface to which the port belongs, as an abnormal network interface.

20. The packet relay device according to claim 13, further comprising:

means for, when the frequency with which an abnormality has occurred in a port exceeds the allowable occurrence frequency, handling a network interface to which the port belongs, as an abnormal network interface.

\* \* \* \* \*